United States Patent
Nuno et al.

(10) Patent No.: US 7,409,640 B2
(45) Date of Patent: Aug. 5, 2008

(54) ELECTRONIC SERVICE MANUAL FOR PRODUCT CONSTITUTED BY ELECTRIC OR ELECTRONIC CIRCUIT

(75) Inventors: Ikuo Nuno, Yokohama (JP); Hatsuo Okubo, Yokohama (JP)

(73) Assignee: Victor Company of Japan, Ltd., Yokohama (JP)

(*) Notice: Subject to any disclaimer, the term of this patent is extended or adjusted under 35 U.S.C. 154(b) by 469 days.

(21) Appl. No.: 10/555,186

(22) PCT Filed: May 20, 2004

(86) PCT No.: PCT/JP2004/006831

§ 371 (c)(1),
(2), (4) Date: Nov. 1, 2005

(87) PCT Pub. No.: WO2004/104861

PCT Pub. Date: Dec. 2, 2004

(65) Prior Publication Data

US 2007/0033525 A1    Feb. 8, 2007

(30) Foreign Application Priority Data

May 20, 2003    (JP) .............................. 2003-142587

(51) Int. Cl.
*G06F 3/00*    (2006.01)
(52) U.S. Cl. ........................ 715/705; 715/714; 715/810; 716/1
(58) Field of Classification Search ................. 715/714, 715/705, 810, 711, 712, 708, 763; 716/1, 716/4, 8, 9
See application file for complete search history.

(56) References Cited

U.S. PATENT DOCUMENTS

| 5,884,315 | A | * | 3/1999 | Dunn | .......................... | 707/102 |
| 2002/0026385 | A1 | * | 2/2002 | McCloskey et al. | ........... | 705/27 |
| 2003/0187751 | A1 | * | 10/2003 | Watson et al. | ................. | 705/26 |

FOREIGN PATENT DOCUMENTS

| JP | 08-016640 | 1/1996 |
| JP | 09-006194 | 1/1997 |
| JP | 09-120415 | 5/1997 |
| JP | 9-190460 | 7/1997 |
| JP | 10-111863 | 4/1998 |
| JP | 11-149494 | 6/1999 |

(Continued)

*Primary Examiner*—Weilun Lo
*Assistant Examiner*—Rashedul Hassan
(74) *Attorney, Agent, or Firm*—Louis Woo

(57) ABSTRACT

A technique for performing an information search relate to parts included in a circuit diagram or a board diagram displayed on a display screen. Network connection destination information, which includes URL information for a predetermined server, a type of information to be transmitted to the server and a predetermined transmission method, are read from a local hard disk. When a predetermined manipulation is performed for a graphics primitive, the network connection destination information is referred to and menu information that enables selection of a predetermined server is generated and displayed. Further, when a predetermined server is selected on the menu information, a part corresponding to parts identification information designated for the selected graphics primitive is searched for, information therefor is obtained, a search request is issued to the predetermined server, and the search results are displayed on a display device.

8 Claims, 29 Drawing Sheets

FOREIGN PATENT DOCUMENTS

| | | |
|---|---|---|
| JP | 2000-194741 | 7/2000 |
| JP | 2001-222541 | 8/2001 |
| JP | 2002-099550 | 4/2002 |
| JP | 2002-149678 | 5/2002 |
| JP | 2003-058564 | 2/2003 |

* cited by examiner

FIG. 20

NETWORK CONNECTION DESTINATION INFORMATION

| | | |
|---|---|---|
| 1 | TITLE NAME | PARTS DATABASE AAA |
| | URL INFORMATION | http://www.XXXXX |
| | TRANSMISSION INFORMATION | MODEL NAME, PART NUMBER |
| | TRANSMISSION METHOD | POST |
| | USER ID | ○○○○○ |
| | USER PASSWORD | △△△△△ |
| 2 | TITLE NAME | PARTS DATABASE BBB |
| | URL INFORMATION | http://www.XXXXX |
| | TRANSMISSION INFORMATION | MODEL NAME, SYMBOL NUMBER |
| | TRANSMISSION METHOD | POST |
| | USER ID | ○○○○○ |
| | USER PASSWORD | △△△△△ |
| 3 | TITLE NAME | SEARCH SITE CCC |
| | URL INFORMATION | http://www.XXXXX |
| | TRANSMISSION INFORMATION | MODEL NAME, PART NAME, PART NUMBER |
| | TRANSMISSION METHOD | GET |
| | USER ID | |
| | USER PASSWORD | |
| ⁔ | ⁔ | ⁔ |

RECOVERING DATA

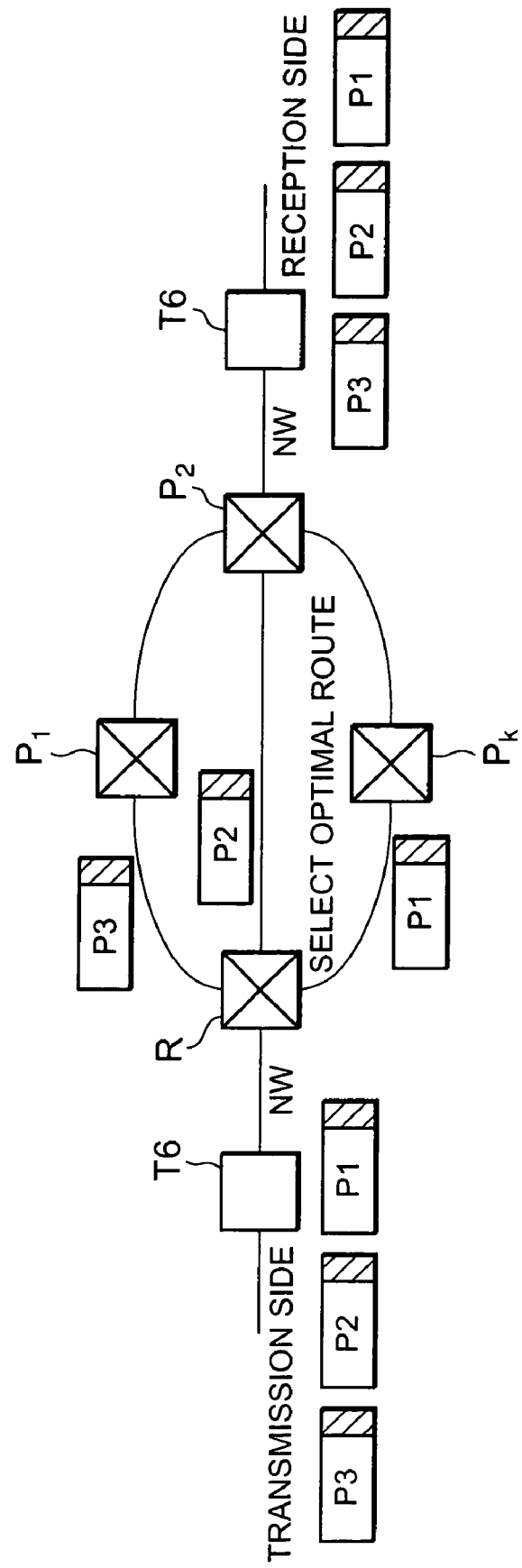

ELECTRONIC SERVICE MANUAL FOR PRODUCT CONSTITUTED BY ELECTRIC OR ELECTRONIC CIRCUIT

TECHNICAL FIELD

The present invention relates to an electronic service manual display program, for displaying on a computer display device a service manual that provides detailed information for use as a reference when performing an inspection or when providing maintenance and repair servicing for products that include an electric circuit or an electronic circuit; a recording medium on which the display program is recorded; an electronic service manual display control method and an electronic service manual display control apparatus; a program transmission method and a program transmission apparatus; and a program reception method and a program reception apparatus.

BACKGROUND ART

Conventionally, many manufacturers, including electric appliance and automobile makers, produce a variety of products in which electric systems, such as electric or electronic circuits, are used. Further, provided in correlation with these products are service manuals that furnish detailed information for use as a reference for the inspection or the maintenance and repair of the products. Ordinarily, such service manuals are supplied as printed matter, but recently, digitized service manuals (electronic service manuals), which can be browsed using PCs (Personal computers), are increasingly being provided.

Multiple technical drawings, such as circuit diagrams and board diagrams, are inserted in the service manuals. Required for the technical drawings, which include circuit diagrams and board diagrams, are means for arbitrarily enlarging, reducing or moving them during browsing. Therefore, for the electronic service manuals, the use of a vector graphics data format is desired, and for this, the most common vector graphics data format, PDF (Portable Document Format), is employed.

While most electronic service manuals are those obtained by directly digitizing the printed matter for the service manuals, there are also electronic service manuals for which a hyperlink, for coupling data, is embedded at a predetermined location so that the display of a circuit diagram, for example, can be quickly changed to display the caption for the circuit diagram.

Furthermore, in patent document 1, disclosed below, is a parts search system wherein a server and a user terminal are connected across a network, and wherein when the server receives a product or parts search request issued by the user terminal, the server transmits to the user terminal information that is related to a requested product or part.

Patent Document 1: Japanese Patent Application Publication No. 2002-99550

However, for an electronic service manual wherein a hyperlink is embedded for coupling data, an electronic service manual producer must designate in advance data to be coupled, and moreover, must embed a hyperlink for coupling the data. At present, where there are service manuals for a large variety of products and an extensive number of parts are included in the service manuals, an enormous amount of labor is required to embed hyperlinks in these parts, and the embedding process is very difficult.

Furthermore, this hyperlink is provided as a very fixed one. For example, especially for a PDF file, when URL information such as a search site is embedded using a hyperlink, the URL information can not be changed unless special software for PDF processing is employed. Further, since a keyword, for example, can not be transmitted even when a link is connected to a search site, it is impossible, by means of conventional hyperlink embedding, for information concerning each part to be searched for in a search site. That is, since it is impossible through the embedding of a hyperlink for information concerning each part to be searched for in a plurality of search sites and the site of a parts database, and since changes in a setup, by a user, is also limited, the usability of a conventional electronic service manual is very poor.

A part search system disclosed in patent document 1 is a system wherein images, based on a parts list or a service manual, are browsed by using a user terminal, and the location of a search requested part is narrowed down in accordance with an instruction given using a mouse, and wherein an enlarged image of a location designated by a user using the mouse and detailed information therefor are provided by a server, so that the search operation initiated by the user is supported. Therefore, in no way is an idea expressed that useful information for parts in a circuit or on a board can be obtained by employing a search site on the Internet or at the site of a parts database.

DISCLOSURE OF THE INVENTION

To resolve the above described shortcoming, it is one objective of the present invention to provide an electronic service manual display program that is superior in searching for information and that can reduce the labor demanded of an electronic service manual producer for the production of contents; a recording medium on which such a program is recorded; an electronic service manual display control method and an electronic service manual display control apparatus; a program transmission method and a program transmission apparatus; and a program reception method and a program reception apparatus. It is also another objective of the present invention to provide an electronic service manual display program whereby, for example, search sites on the Internet or the site of a parts database is employed, and an appropriate search keyword is transmitted to databases, accumulated in these sites, for the history of an operation failure for each part and for a method for correcting the operation failure, so that useful information concerning the individual parts can be obtained; a recording medium on which such a program is recorded; an electronic service manual display control method and an electronic service manual display control apparatus; a program transmission method and a program transmission apparatus; and a program reception method and a program reception apparatus.

To achieve the above objectives, according to the present invention, provided is an electronic service manual display program, which permits a computer to provide a function for displaying, on a display device, information that is related to parts and that is used for a predetermined product constituted by an electric circuit or an electronic circuit employing the parts as components, and at the least either a board diagram that represents not only a board used for the predetermined product but also the parts mounted on the board, or a circuit diagram that represents a circuit provided on the board, and which permits the computer to perform the steps of:

displaying, in a designated index page display area, an index page showing a list of names for, at the least, either the board or the circuit;

displaying, in a designated parts table page display area, a parts table page showing a list of the parts;

establishing in advance, for each of the names published on the index page, index page information, which is drawing identification information for a drawing, at the least either a board diagram for the board or a circuit diagram for the circuit, that corresponds to the name, and when one of the names displayed on the index page display area is selected, obtaining from the index page information the drawing identification information that is designated in correlation with the selected name;

searching for the drawing designated by the thus obtained drawing identification information, and displaying the drawing in a designated drawing display area;

reading network connection destination information that includes URL information for a predetermined server having an information search function, information indicating an information type to be transmitted to the predetermined server, and search setup information for which is designated information indicating a method for transmissions to the predetermined server;

establishing, in advance for one graphics primitive of graphics primitives that are constituents of the drawing, graphics primitive information, which is parts identification information corresponding to the part, and when a predetermined operation is performed for one of the graphics primitives that constitute the board diagram or the circuit diagram displayed in the drawing display area, examining the network connection destination information and generating and displaying menu information that includes a choice for an information search using the predetermined server;

when the choice is selected in the menu information, employing the parts identification information included in the graphics primitive information for the selected graphics primitive, and obtaining, from parts table database information wherein detailed information concerning each of the parts is stored with the parts identification information for the part, information of a type to be transmitted to the predetermined server;

employing the method for transmission to the predetermined server for transmitting, to the predetermined server specified by the URL information, the obtained information of the type to be transmitted to the predetermined server;

receiving, from the predetermined server, search results information concerning the information search that has been performed, by the predetermined server, based on the information transmitted to the predetermined server; and displaying the search results information that is received.

Furthermore, to achieve the above objectives, according to the present invention, provided is an electronic service manual display program, which permits a computer to provide a function for displaying, on a display device, information that is related to parts and that is used for a predetermined product constituted by an electric circuit or an electronic circuit employing the parts as components, and at the least either a board diagram that represents not only a board used for the predetermined product but also the parts mounted on the board, or a circuit diagram that represents a circuit provided on the board, and which permits the computer to perform the steps of:

displaying an index page display area for displaying an index page on which a list of names for, at the least, either the board or the circuit is published;

displaying a parts table page display area for displaying a parts table page on which a list of the parts is published;

displaying a drawing display area to display a drawing, at the least, either a board diagram for the board or a circuit diagram for the circuit; displaying the index page in the index page display area;

displaying the parts table page in the parts table page display area;

establishing in advance, for each of the names published on the index page, index page information, which is drawing identification information for the drawing corresponding to the names, and when one of the names displayed in the index page display area is selected, obtaining from the index page information the drawing identification information that is designated for the selected name;

when the thus obtained drawing identification information is information for a designation of the board diagram or the circuit diagram, searching for and displaying, in the drawing display area, the board diagram or the circuit diagram that corresponds to the drawing identification information;

when the drawing identification information thus obtained is information for a designation of both the board diagram and the circuit diagram, dividing the drawing display area into first and second display areas and searching for and displaying, in the first and second display areas, the board diagram and the circuit diagram that correspond to the drawing identification information;

reading network connection destination information that includes URL information for a predetermined server having an information search function, information indicating an information type to be transmitted to the predetermined server, and search setup information for which is designated information indicating a method for transmissions to the predetermined server;

establishing, in advance for one graphics primitive of graphics primitives that are constituents of the drawing, graphics primitive information, which is parts identification information corresponding to the part, and when a predetermined operation is performed for one of the graphics primitives that constitute the board diagram or the circuit diagram displayed in the drawing display area, examining the network connection destination information and generating and displaying menu information that includes a choice for an information search using the predetermined server;

when the choice is selected in the menu information, employing the parts identification information included in the graphics primitive information for the selected graphics primitive, and obtaining, from parts table database information wherein detailed information concerning each of the parts is stored with the parts identification information for the part, information of a type to be transmitted to the predetermined server;

employing the method for transmission to the predetermined server for transmitting, to the predetermined server specified by the URL information, the obtained information of the type to be transmitted to the predetermined server;

receiving, from the predetermined server, search results information concerning the information search that has been performed, by the predetermined server, based on the information transmitted to the predetermined server; and displaying the search results information that is received.

Further, to achieve the above objectives, according to the present invention, provided is a recording medium, on which recorded is an electronic service manual display program that permits a computer to provide a function for displaying, on a display device, information that is related to parts and that is used for a predetermined product constituted by an electric circuit or an electronic circuit employing the parts as components, and at the least either a board diagram that represents not only a board used for the predetermined product but also the parts mounted on the board, or a circuit diagram that represents a circuit provided on the board, and that permits the computer to perform the steps of:

displaying, in a designated index page display area, an index page showing a list of names for, at the least, either the board or the circuit;

displaying, in a designated parts table page display area, a parts table page showing a list of the parts;

establishing in advance, for each of the names published on the index page, index page information, which is drawing identification information for a drawing, at the least either a board diagram for the board or a circuit diagram for the circuit, that corresponds to the name, and when one of the names displayed on the index page display area is selected, obtaining from the index page information the drawing identification information that is designated in correlation with the selected name;

searching for the drawing designated by the thus obtained drawing identification information, and displaying the drawing in a designated drawing display area;

reading network connection destination information that includes URL information for a predetermined server having an information search function, information indicating an information type to be transmitted to the predetermined server, and search setup information for which is designated information indicating a method for transmissions to the predetermined server;

establishing, in advance for one graphics primitive of graphics primitives that are constituents of the drawing, graphics primitive information, which is parts identification information corresponding to the part, and when a predetermined operation is performed for one of the graphics primitives that constitute the board diagram or the circuit diagram displayed in the drawing display area, examining the network connection destination information and generating and displaying menu information that includes a choice for an information search using the predetermined server;

when the choice is selected in the menu information, employing the parts identification information included in the graphics primitive information for the selected graphics primitive, and obtaining, from parts table database information wherein detailed information concerning each of the parts is stored with the parts identification information for the part, information of a type to be transmitted to the predetermined server;

employing the method for transmission to the predetermined server for transmitting, to the predetermined server specified by the URL information, the obtained information of the type to be transmitted to the predetermined server;

receiving, from the predetermined server, search results information concerning the information search that has been performed, by the predetermined server, based on the information transmitted to the predetermined server; and displaying the search results information that is received.

Furthermore, to achieve the above objectives, according to the present invention, provided is a recording medium, on which recorded is an electronic service manual display program that permits a computer to provide a function for displaying, on a display device, information that is related to parts and that is used for a predetermined product constituted by an electric circuit or an electronic circuit employing the parts as components, and at the least either a board diagram that represents not only a board used for the predetermined product but also the parts mounted on the board, or a circuit diagram that represents a circuit provided on the board, and that permits the computer to perform the steps of:

displaying an index page display area for displaying an index page on which a list of names for, at the least, either the board or the circuit is published;

displaying a parts table page display area for displaying a parts table page on which a list of the parts is published;

displaying a drawing display area to display a drawing, at the least, either a board diagram for the board or a circuit diagram for the circuit; displaying the index page in the index page display area;

displaying the parts table page in the parts table page display area;

establishing in advance, for each of the names published on the index page, index page information, which is drawing identification information for the drawing corresponding to the names, and when one of the names displayed in the index page display area is selected, obtaining from the index page information the drawing identification information that is designated for the selected name;

when the thus obtained drawing identification information is information for a designation of the board diagram or the circuit diagram, searching for and displaying, in the drawing display area, the board diagram or the circuit diagram that corresponds to the drawing identification information;

when the drawing identification information thus obtained is information for a designation of both the board diagram and the circuit diagram, dividing the drawing display area into first and second display areas and searching for and displaying, in the first and second display areas, the board diagram and the circuit diagram that correspond to the drawing identification information;

reading network connection destination information that includes URL information for a predetermined server having an information search function, information indicating an information type to be transmitted to the predetermined server, and search setup information for which is designated information indicating a method for transmissions to the predetermined server;

establishing, in advance for one graphics primitive of graphics primitives that are constituents of the drawing, graphics primitive information, which is parts identification information corresponding to the part, and when a predetermined operation is performed for one of the graphics primitives that constitute the board diagram or the circuit diagram displayed in the drawing display area, examining the network connection destination information and generating and displaying menu information that includes a choice for an information search using the predetermined server;

when the choice is selected in the menu information, employing the parts identification information included in the graphics primitive information for the selected graphics primitive, and obtaining, from parts table database information wherein detailed information concerning each of the parts is stored with the parts identification information for the part, information of a type to be transmitted to the predetermined server;

employing the method for transmission to the predetermined server for transmitting, to the predetermined server specified by the URL information, the obtained information of the type to be transmitted to the predetermined server;

receiving, from the predetermined server, search results information concerning the information search that has been performed, by the predetermined server, based on the information transmitted to the predetermined server; and displaying the search results information that is received.

In addition, to achieve the above objectives, according to the present invention, provided is an electronic service manual display control method, for displaying, on a display device, information that is related to parts and that is used for a predetermined product constituted by an electric circuit or an electronic circuit employing the parts as components, and at the least either a board diagram that represents not only a board used for the predetermined product but also the parts mounted on the board, or a circuit diagram that represents a circuit provided on the board, comprising the steps of:

displaying, in a designated index page display area, an index page showing a list of names for, at the least, either the board or the circuit;

displaying, in a designated parts table page display area, a parts table page showing a list of the parts;

establishing in advance, for each of the names published on the index page, index page information, which is drawing identification information for a drawing, at the least either a board diagram for the board or a circuit diagram for the circuit, that corresponds to the name, and when one of the names displayed on the index page display area is selected, obtaining from the index page information the drawing identification information that is designated in correlation with the selected name;

searching for the drawing designated by the thus obtained drawing identification information, and displaying the drawing in a designated drawing display area;

reading network connection destination information that includes URL information for a predetermined server having an information search function, information indicating an information type to be transmitted to the predetermined server, and search setup information for which is designated information indicating a method for transmissions to the predetermined server;

establishing, in advance for one graphics primitive of graphics primitives that are constituents of the drawing, graphics primitive information, which is parts identification information corresponding to the part, and when a predetermined operation is performed for one of the graphics primitives that constitute the board diagram or the circuit diagram displayed in the drawing display area, examining the network connection destination information and generating and displaying menu information that includes a choice for an information search using the predetermined server;

when the choice is selected in the menu information, employing the parts identification information included in the graphics primitive information for the selected graphics primitive, and obtaining, from parts table database information wherein detailed information concerning each of the parts is stored with the parts identification information for the part, information of a type to be transmitted to the predetermined server;

employing the method for transmission to the predetermined server for transmitting, to the predetermined server specified by the URL information, the obtained information of the type to be transmitted to the predetermined server;

receiving, from the predetermined server, search results information concerning the information search that has been performed, by the predetermined server, based on the information transmitted to the predetermined server; and displaying the search results information that is received.

Moreover, to achieve the above objectives, according to the present invention, provided is an electronic service manual display control apparatus, for displaying, on a display device, information that is related to parts and that is used for a predetermined product constituted by an electric circuit or an electronic circuit employing the parts as components, and at the least either a board diagram that represents not only a board used for the predetermined product but also the parts mounted on the board, or a circuit diagram that represents a circuit provided on the board, comprising:

means for displaying, in a designated index page display area, an index page showing a list of names for, at the least, either the board or the circuit;

means for displaying, in a designated parts table page display area, a parts table page showing a list of the parts;

means for establishing in advance, for each of the names published on the index page, index page information, which is drawing identification information for a drawing, at the least either a board diagram for the board or a circuit diagram for the circuit, that corresponds to the name, and for, when one of the names displayed on the index page display area is selected, obtaining from the index page information the drawing identification information that is designated in correlation with the selected name;

means for searching for the drawing designated by the thus obtained drawing identification information, and displaying the drawing in a designated drawing display area;

means for reading network connection destination information that includes URL information for a predetermined server having an information search function, information indicating an information type to be transmitted to the predetermined server, and search setup information for which is designated information indicating a method for transmissions to the predetermined server;

means for establishing, in advance for one graphics primitive of graphics primitives that are constituents of the drawing, graphics primitive information, which is parts identification information corresponding to the part, and for, when a predetermined operation is performed for one of the graphics primitives that constitute the board diagram or the circuit diagram displayed in the drawing display area, examining the network connection destination information and generating and displaying menu information that includes a choice for an information search using the predetermined server;

means for, when the choice is selected in the menu information, employing the parts identification information included in the graphics primitive information for the selected graphics primitive, and obtaining, from parts table database information wherein detailed information concerning each of the parts is stored with the parts identification information for the part, information of a type to be transmitted to the predetermined server;

means for employing the method for transmission to the predetermined server for transmitting, to the predetermined server specified by the URL information, the obtained information of the type to be transmitted to the predetermined server;

means for receiving, from the predetermined server, search results information concerning the information search that has been performed, by the predetermined server, based on the information transmitted to the predetermined server; and means for displaying the search results information that is received.

Furthermore, to achieve the above objectives, according to the present invention, provided is a program transmission method, for transmitting an electronic service manual display program that permits a computer to provide a function for displaying, on a display device, information that is related to parts and that is used for a predetermined product constituted by an electric circuit or an electronic circuit employing the parts as components, and at the least either a board diagram that represents not only a board used for the predetermined product but also the parts mounted on the board, or a circuit diagram that represents a circuit provided on the board, comprising the steps of:

converting the electronic service manual display program into a digital signal sequence, for a communication line or a network, with an added header; and initiating employment of a communication protocol with a partner station across the communication line or the network and transmitting the digital signal sequence, whereby the electronic service manual display program includes the steps of displaying, in a designated index page display area, an index page showing a list of names for, at the least, either the board or the circuit, displaying, in a designated parts table page display area, a parts table page showing a list of the parts, establishing in advance, for each of the names published on the index page, index page information, which is drawing identification information for a drawing, at the least either a board diagram for the board or a circuit diagram for the circuit, that corresponds to the name, and when one of the names displayed on the index page display area is selected, obtaining from the index page information the drawing identification information that is designated in correlation with the selected name, searching for the drawing designated by the thus obtained drawing identification information, and displaying the drawing in a designated drawing display area, reading network connection destination information that includes URL information for a predetermined server having an information search function, information indicating an information type to be transmitted to the predetermined server, and search setup information for which is designated information indicating a method for transmissions to the predetermined server, establishing, in advance for one graphics primitive of graphics primitives that are constituents of the drawing, graphics primitive information, which is parts identification information corresponding to the part, and when a predetermined operation is performed for one of the graphics primitives that constitute the board diagram or the circuit diagram displayed in the drawing display area, examining the network connection destination information and generating and displaying menu information that includes a choice for an information search using the predetermined server, when the choice is selected in the menu information, employing the parts identification information included in the graphics primitive information for the selected graphics primitive, and obtaining, from parts table database information wherein detailed information concerning each of the parts is stored with the parts identification information for the part, information of a type to be transmitted to the predetermined server, employing the method for transmission to the predetermined server for transmitting, to the predetermined server specified by the URL information, the obtained information of the type to be transmitted to the predetermined server, receiving, from the predetermined server, search results information concerning the information search that has been performed, by the predetermined server, based on the information transmitted to the predetermined server, and displaying the search results information that is received.

Further, to achieve the above objectives, according to the present invention, provided is a program transmission apparatus, for transmitting an electronic service manual display program that permits a computer to provide a function for displaying, on a display device, information that is related to parts and that is used for a predetermined product constituted by an electric circuit or an electronic circuit employing the parts as components, and at the least either a board diagram that represents not only a board used for the predetermined product but also the parts mounted on the board, or a circuit diagram that represents a circuit provided on the board, comprising:

conversion means for converting the electronic service manual display program into a digital signal sequence, for a communication line or a network, with an added header; and transmission means for initiating employment of a communication protocol with a partner station across the communication line or the network and transmitting the digital signal sequence, wherein the electronic service manual display program includes the steps of displaying, in a designated index page display area, an index page showing a list of names for, at the least, either the board or the circuit, displaying, in a designated parts table page display area, a parts table page showing a list of the parts, establishing in advance, for each of the names published on the index page, index page information, which is drawing identification information for a drawing, at the least either a board diagram for the board or a circuit diagram for the circuit, that corresponds to the name, and when one of the names displayed on the index page display area is selected, obtaining from the index page information the drawing identification information that is designated in correlation with the selected name, searching for the drawing designated by the thus obtained drawing identification information, and displaying the drawing in a designated drawing display area, reading network connection destination information that includes URL information for a predetermined server having an information search function, information indicating an information type to be transmitted to the predetermined server, and search setup information for which is designated information indicating a method for transmissions to the predetermined server, establishing, in advance for one graphics primitive of graphics primitives that are constituents of the drawing, graphics primitive information, which is parts identification information corresponding to the part, and when a predetermined operation is performed for one of the graphics primitives that constitute the board diagram or the circuit diagram displayed in the drawing display area, examining the network connection destination information and generating and displaying menu information that includes a choice for an information search using the predetermined server, when the choice is selected in the menu information, employing the parts identification information included in the graphics primitive information for the selected graphics primitive, and obtaining, from parts table database information wherein detailed information concerning each of the parts is stored with the parts identification information for the part, information of a type to be transmitted to the predetermined server, employing the method for transmission to the predetermined server for transmitting, to the predetermined server specified by the URL information, the obtained information of the type to be transmitted to the predetermined server, receiving, from the predetermined server, search results information concerning the information search that has been performed, by the predetermined server, based on the information transmitted to the predetermined server, and displaying the search results information that is received.

Furthermore, to achieve the above objectives, according to the present invention, provided is a program reception method, for receiving an electronic service manual display program that permits a computer to provide a function for displaying, on a display device, information that is related to parts and that is used for a predetermined product constituted by an electric circuit or an electronic circuit employing the parts as components, and at the least either a board diagram that represents not only a board used for the predetermined product but also the parts mounted on the board, or a circuit diagram that represents a circuit provided on the board, comprising the steps of:

initiating employment of a communication protocol with a partner station across a communication line or a network and receiving a digital signal sequence; and removing headers from the digital signal sequence and converting the digital signal sequence used for a communication line or a network into the original electronic service manual display program, whereby the electronic service manual display program includes the steps of displaying, in a designated index page display area, an index page showing a list of names for, at the least, either the board or the circuit, displaying, in a designated parts table page display area, a parts table page showing a list of the parts, establishing in advance, for each of the names published on the index page, index page information, which is drawing identification information for a drawing, at the least either a board diagram for the board or a circuit diagram for the circuit, that corresponds to the name, and when one of the names displayed on the index page display area is selected, obtaining from the index page information the drawing identification information that is designated in correlation with the selected name, searching for the drawing designated by the thus obtained drawing identification information, and displaying the drawing in a designated drawing display area, reading network connection destination information that includes URL information for a predetermined server having an information search function, information indicating an information type to be transmitted to the predetermined server, and search setup information for which is designated information indicating a method for transmissions to the predetermined server, establishing, in advance for one graphics primitive of graphics primitives that are constituents of the drawing, graphics primitive information, which is parts identification information corresponding to the part, and when a predetermined operation is performed for one of the graphics primitives that constitute the board diagram or the circuit diagram displayed in the drawing display area, examining the network connection destination information and generating and displaying menu information that includes a choice for an information search using the predetermined server, when the choice is selected in the menu information, employing the parts identification information included in the graphics primitive information for the selected graphics primitive, and obtaining, from parts table database information wherein detailed information concerning each of the parts is stored with the parts identification information for the part, information of a type to be transmitted to the predetermined server, employing the method for transmission to the predetermined server for transmitting, to the predetermined server specified by the URL information, the obtained information of the type to be transmitted to the predetermined server, receiving, from the predetermined server, search results information concerning the information search that has been performed, by the predetermined server, based on the information transmitted to the predetermined server, and displaying the search results information that is received.

Also, to achieve the above objectives, according to the present invention, provided is a program reception apparatus, for receiving an electronic service manual display program that permits a computer to provide a function for displaying, on a display device, information that is related to parts and that is used for a predetermined product constituted by an electric circuit or an electronic circuit employing the parts as components, and at the least either a board diagram that represents not only a board used for the predetermined product but also the parts mounted on the board, or a circuit diagram that represents a circuit provided on the board, comprising:

reception means for initiating employment of a communication protocol with a partner station across a communication line or a network and receiving a digital signal sequence; and conversion means for removing headers from the digital signal sequence and converting the digital signal sequence used for a communication line or a network into the original electronic service manual display program, wherein the electronic service manual display program includes the steps of displaying, in a designated index page display area, an index page showing a list of names for, at the least, either the board or the circuit, displaying, in a designated parts table page display area, a parts table page showing a list of the parts, establishing in advance, for each of the names published on the index page, index page information, which is drawing identification information for a drawing, at the least either a board diagram for the board or a circuit diagram for the circuit, that corresponds to the name, and when one of the names displayed on the index page display area is selected, obtaining from the index page information the drawing identification information that is designated in correlation with the selected name, searching for the drawing designated by the thus obtained drawing identification information, and displaying the drawing in a designated drawing display area, reading network connection destination information that includes URL information for a predetermined server having an information search function, information indicating an information type to be transmitted to the predetermined server, and search setup information for which is designated information indicating a method for transmissions to the predetermined server, establishing, in advance for one graphics primitive of graphics primitives that are constituents of the drawing, graphics primitive information, which is parts identification information corresponding to the part, and when a predetermined operation is performed for one of the graphics primitives that constitute the board diagram or the circuit diagram displayed in the drawing display area, examining the network connection destination information and generating and displaying menu information that includes a choice for an information search using the predetermined server, when the choice is selected in the menu information, employing the parts identification information included in the graphics primitive information for the selected graphics primitive, and obtaining, from parts table database information wherein detailed information concerning each of the parts is stored with the parts identification information for the part, information of a type to be transmitted to the predetermined server, employing the method for transmission to the predetermined server for transmitting, to the predetermined server specified by the URL information, the obtained information of the type to be transmitted to the predetermined server, receiving, from the predetermined server, search results information concerning the information search that has been performed, by the predetermined server, based on the information transmitted to the predetermined server, and displaying the search results information that is received.

BRIEF DESCRIPTION OF THE DRAWINGS

FIG. 20 A diagram showing example network connection destination information according to the embodiment of the present invention.

FIG. 30 A configuration diagram showing a communication network, extended between a transmission side and a reception side, for the electronic service manual display program for the embodiment of the present invention, and other, additional data.

BEST MODE FOR CARRYING OUT THE INVENTION

Figure 1:
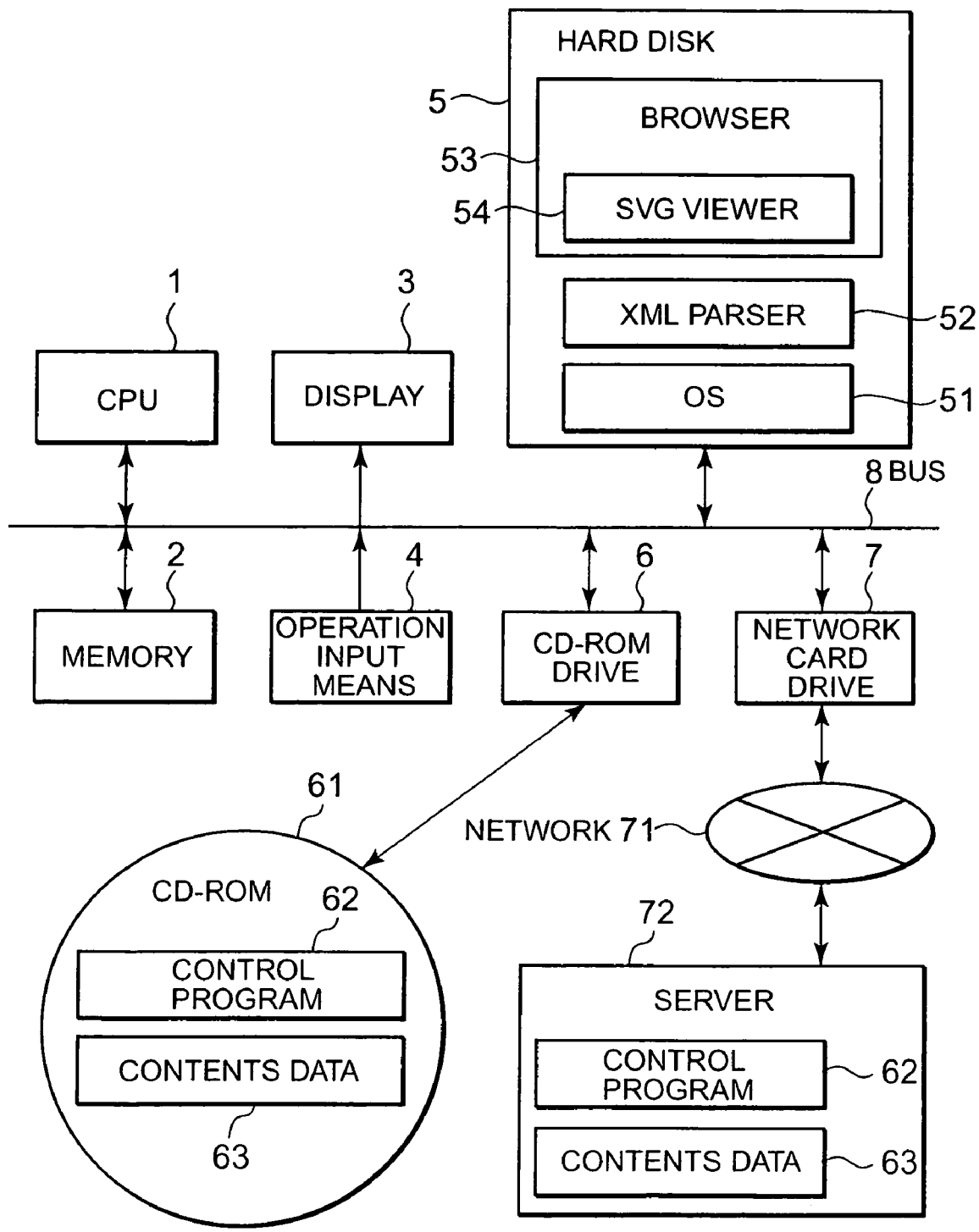
FIG. 1 A hardware configuration diagram used for one embodiment of the present invention.

One embodiment of the present invention will now be described while referring to the drawings. FIG. 1 is a diagram showing a hardware configuration used for the embodiment of the present invention. Interconnected by a bus 8, in the state shown in FIG. 1, are a CPU (Central Processing Unit) 1, for performing a computation process and a control process; a memory 2, for temporarily storing data; a display device 3, such as a CRT (Cathode Ray Tube) display device or a liquid crystal display device for visually presenting information; operation input means 4, such as a keyboard or a mouse for entering an operation or information; a hard disk 5, for storing various digital data; a CD-ROM drive 6, for reading data recorded on a CD-ROM (Compact Disk Read Only Memory) 61; and a network card drive 7, for communicating through a network 71 with a server 72 or another communication device connected to the network.

Stored on the hard disk 5 are an OS (Operating System) 51, which is the basic software for managing software and hardware and for enabling their use by an application; an XML parser 52, for analyzing text written in the XML (eXtensible Markup Language) data; a browser 53, for analyzing and displaying XML data, analyzed by the XML parser 52, or HTML (Hyper Text Markup Language) data; and an SVG viewer 54, for displaying vector graphics data such as SVG (Scalable Vector Graphics) data or SVGZ (compressed SVG) data. It should be noted that the SVG viewer 54 has a function for enabling the enlarged display and the reduced display of SVG data and the shifting and the display of SVG data in a drawing.

These applications are executed by the CPU 1. Further, in the state specifically shown in FIG. 1, the SVG viewer 54 is plugged into the browser 53, and the XML parser 52 is provided independently of the browser 53. However, an environment wherein, for example, the XML parser 52 is incorporated in the browser 53 may be employed. That is, in this case, any environment is available so long as XML data or SVG data can be appropriately displayed by the browser 53.

On the CD-ROM 61 are stored a control program 62, which includes script languages such as XSL (eXtensible Stylesheet Language) data used for determining the display style of the XML data, HTML data or JavaScript (trademark) data, and contents data 63, which include raster image data, such as XML data or PNG (Potable Network Graphics) data, and vector graphics data, such as SVG data or SVGZ data. When these data stored on the CD-ROM 61 are read by using the CD-ROM drive 6, and are processed and displayed by a script engine mounted in the XML parser 52 or the browser 53, contents having a desired form can be displayed on the browser 53. It should be noted that the SVG data are vector graphics data, the file size of which is smaller than that of PDF data, and is written on the XML base.

Further, in addition to the CD-ROM drive 6 and the CD-ROM 61, a set consisting of a DVD (Digital Versatile Disk) reading drive and a DVD, or various other recording medium readers and recording media can be employed. Further, by using the network card drive 7, a control program 62 and contents data 63 stored in a predetermined communication device (e.g., the server 72) connected to the network 71 can be obtained, and a desired display can be presented on the browser 53. Also, a required control program 62 and required contents data 63 can be stored in advance on the hard disk 5.

The configuration wherein the CPU 1, the memory 2, the display device 3, the operation input means 4, the hard disk 5, the CD-ROM drive 6 and the network card drive 7 are interconnected by the bus 8 can also be provided, for example, by a common PC. In the following explanation, an example is employed wherein a common PC is employed to perform the processing related to a service manual and to provide a display for the service manual.

An explanation will now be given for the processing performed to display contents data 63 on the display device 3. For this, a service manual related to one specific product will be described. Basically, contents data 63 are prepared for each product, so that for one product one service manual is available. That is, for example, a service manual is individually prepared for each model of a DVD audio player. To present this service manual, XML data, included with the contents data 63, are employed as a database.

To display the contents of XML data on the display device 3, first, the XML parser 52 analyzes the hierarchical structure of and the format used for the XML data stored on the CD-ROM 61, or in the server 72 or another data storage means. The XML data analyzed by the XML parser 52 are then transmitted to the browser 53 or the SVG viewer 54, where they are processed by referring to predetermined XSL data. The resultant XML data are then displayed.

A specific explanation will now be given for an index page, a circuit diagram page, a board diagram page and a parts table page that are generated, based on the XML data included in the contents data 63, and displayed on the display device 3. The index page and the parts table page are set up so that they are displayed by the browser 53, as desired, in accordance with a data set consisting of XML data for each corresponding page and predesignated XSL data. The circuit diagram page and the board diagram page are set so that they can be displayed by the browser 53, as desired, in accordance with SVG data or SVGZ data for each corresponding page.

Figure 10:
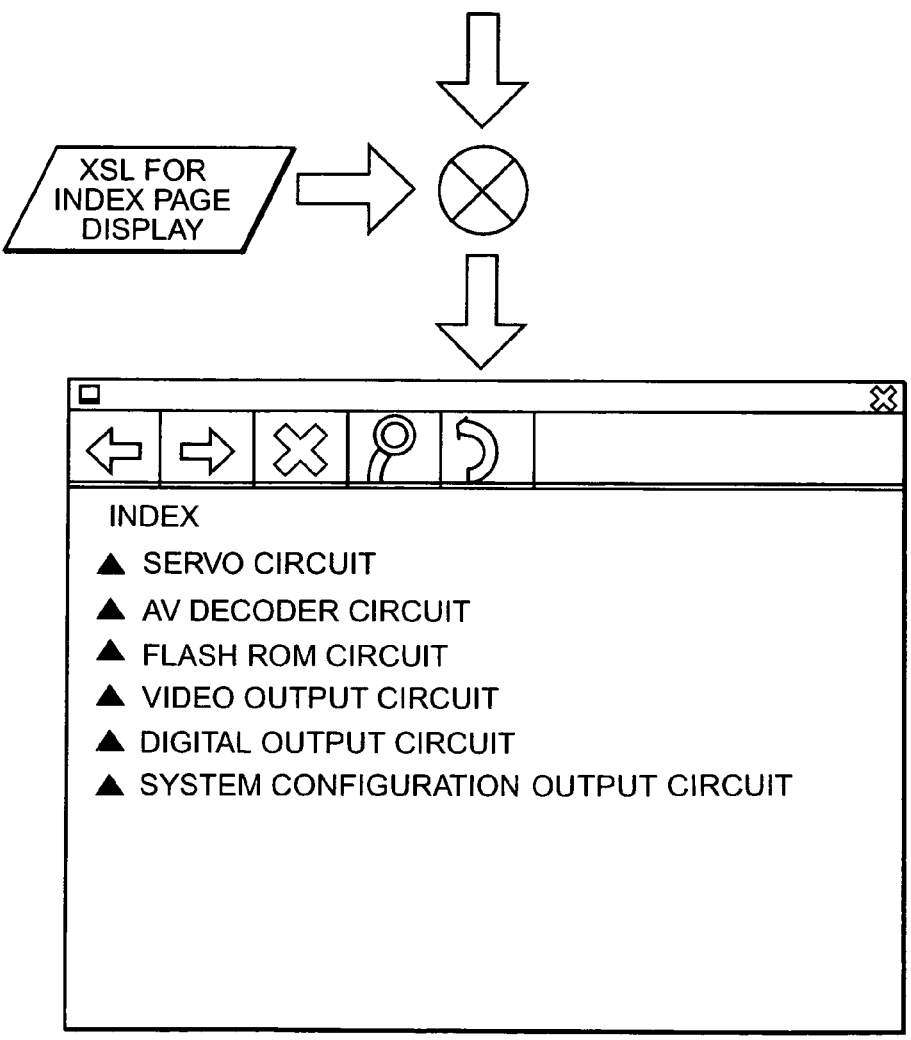
FIG. 10 A diagram showing example index XML data and an example index page generated based on the index XML data according to the embodiment of the present invention.

For example, in FIG. 10 are shown example XML data (index XML data) for a corresponding index page and the state wherein the index XML data are processed and displayed by the browser 53. The index XML data represent a correlation of all the circuits mounted in the pertinent model, the browsing modes (which will be described later) for displaying SVG data related to the individual circuits, the circuit diagram data names (first SVG data names) for displaying detailed circuit diagrams for these circuits, and the board diagram data names (second SVG data names) for displaying display board diagrams for the individual circuits that are mounted.

To display index XML data on the browser 53, XSL for an index page display is used to process the index XML data. For example, an index page for displaying the list of circuits is generated based on the index XML data. The categories (hereinafter also referred to as drawing categories) in the circuit list can be selected by using a mouse, for example, and as will be described later, by selecting a drawing category, a circuit diagram or a board diagram that corresponds to the selected drawing category (specifically, a circuit diagram (first SVG data name) or a board diagram (second SVG data name) correlated in the index XML data) is selectively displayed in a predetermined frame.

Figure 11:
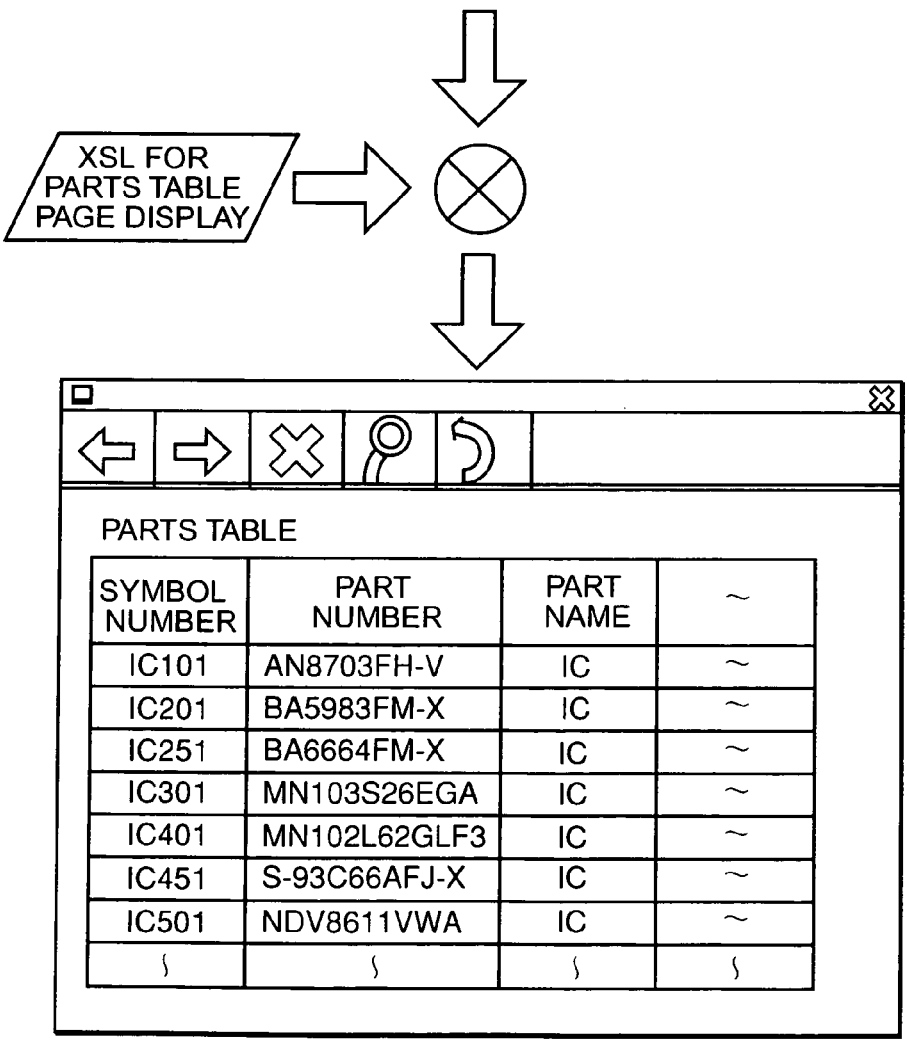
FIG. 11 A diagram showing example parts table XML data and an example index page generated based on the parts table XML data according to the embodiment of the present invention.

Shown in FIG. 11 are example XML data (parts table XML data) corresponding to a parts table page and the state wherein the parts table XML data are processed and displayed on the browser 53. For the parts table XML data, a record is provided for each of the parts, such as an IC, a resistor and a diode, that constitute a circuit. This record includes not only various information such as a symbol number (identification number), a part number and a part name, but also the names of circuit diagram data and board diagram data where the pertinent part exists. A symbol number is provided for each part so as to correlate each part with a specific symbol number without overlapping, i.e., one record is correlated with one symbol number. Furthermore, the parts table XML data satisfactorily represents all the parts of all the circuits constituting the model.

To enable the browser 53 to display the parts table XML data, XSL for a parts table page display is used to process the parts table XML data. For example, a parts table page for the display of the list of parts is generated based on the parts table XML data. The individual entries (hereinafter also referred to as part entries) in the parts table list can be selected by using a mouse, for example, and as will be described later, by selecting a part entry, a circuit diagram or a board diagram corresponding to the selected part entry (specifically, a circuit diagram (first SVG data name) or a board diagram (second SVG data name) correlated in the parts table XML data) is selectively displayed in a predetermined frame.

Figure 12:
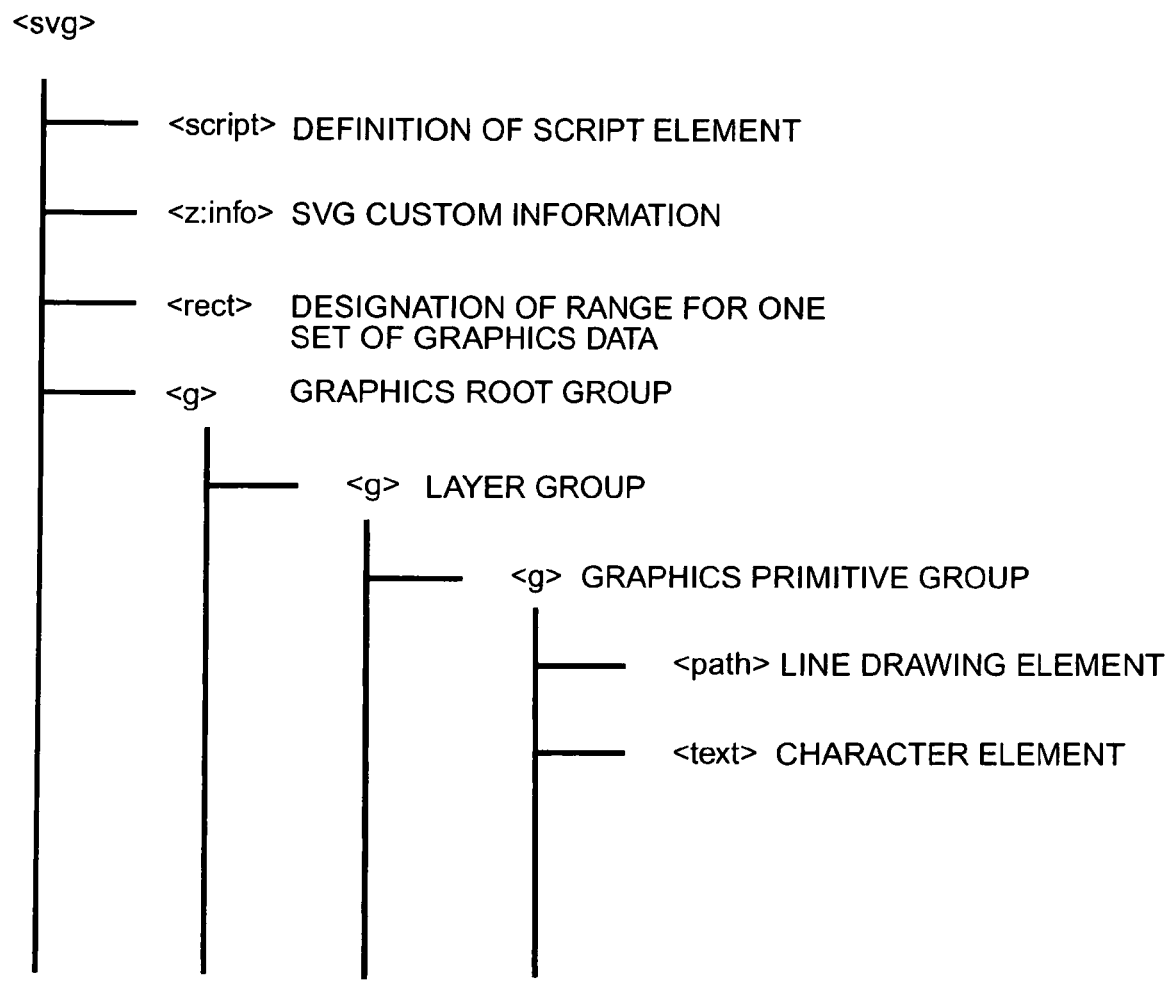
FIG. 12 A diagram showing an example SVG data structure according to the embodiment of the present invention.
Figure 13:
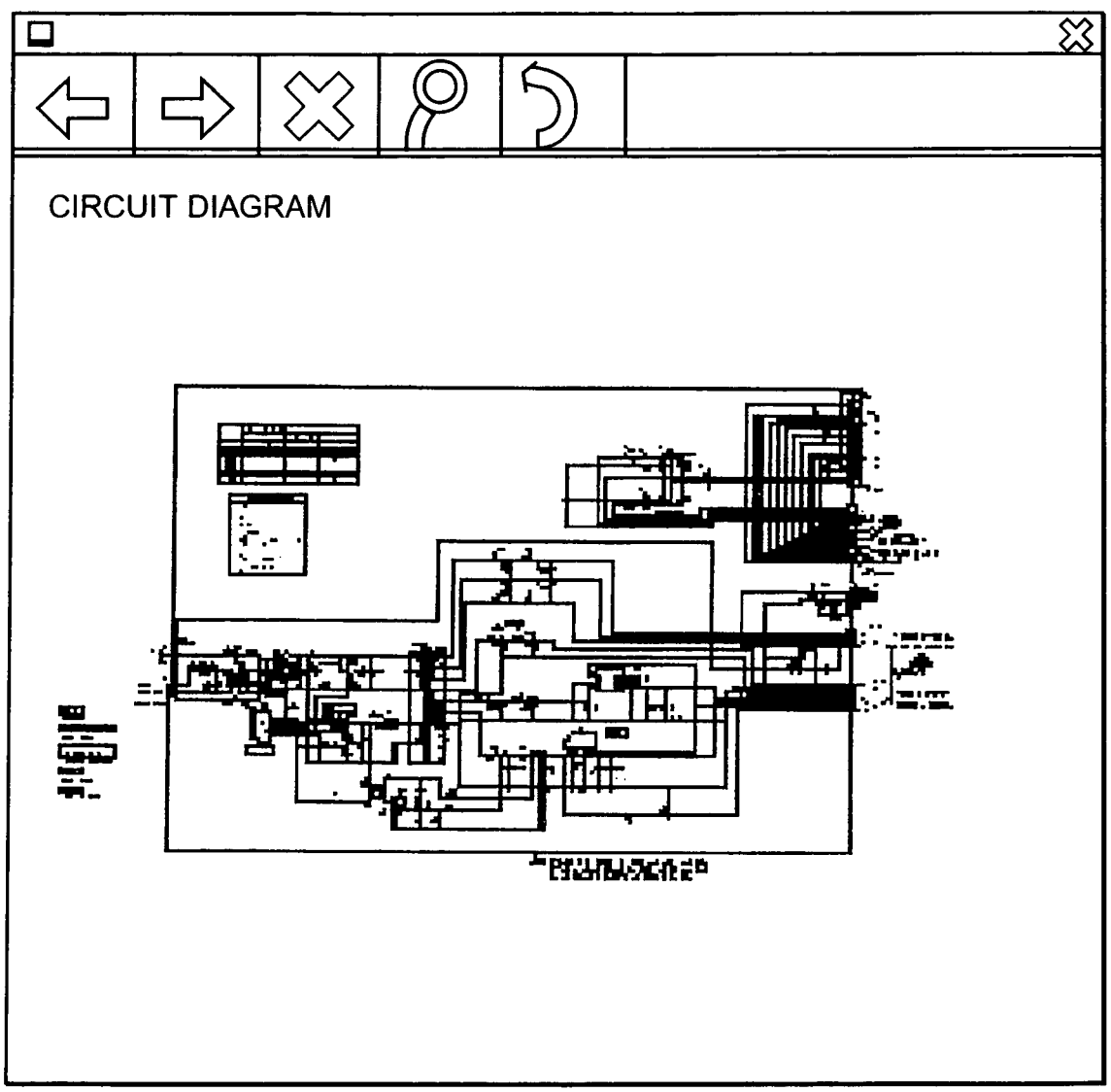
FIG. 13 An example circuit diagram to be displayed by processing SVG data using an SVG viewer according to the embodiment of the present invention.
Figure 14:
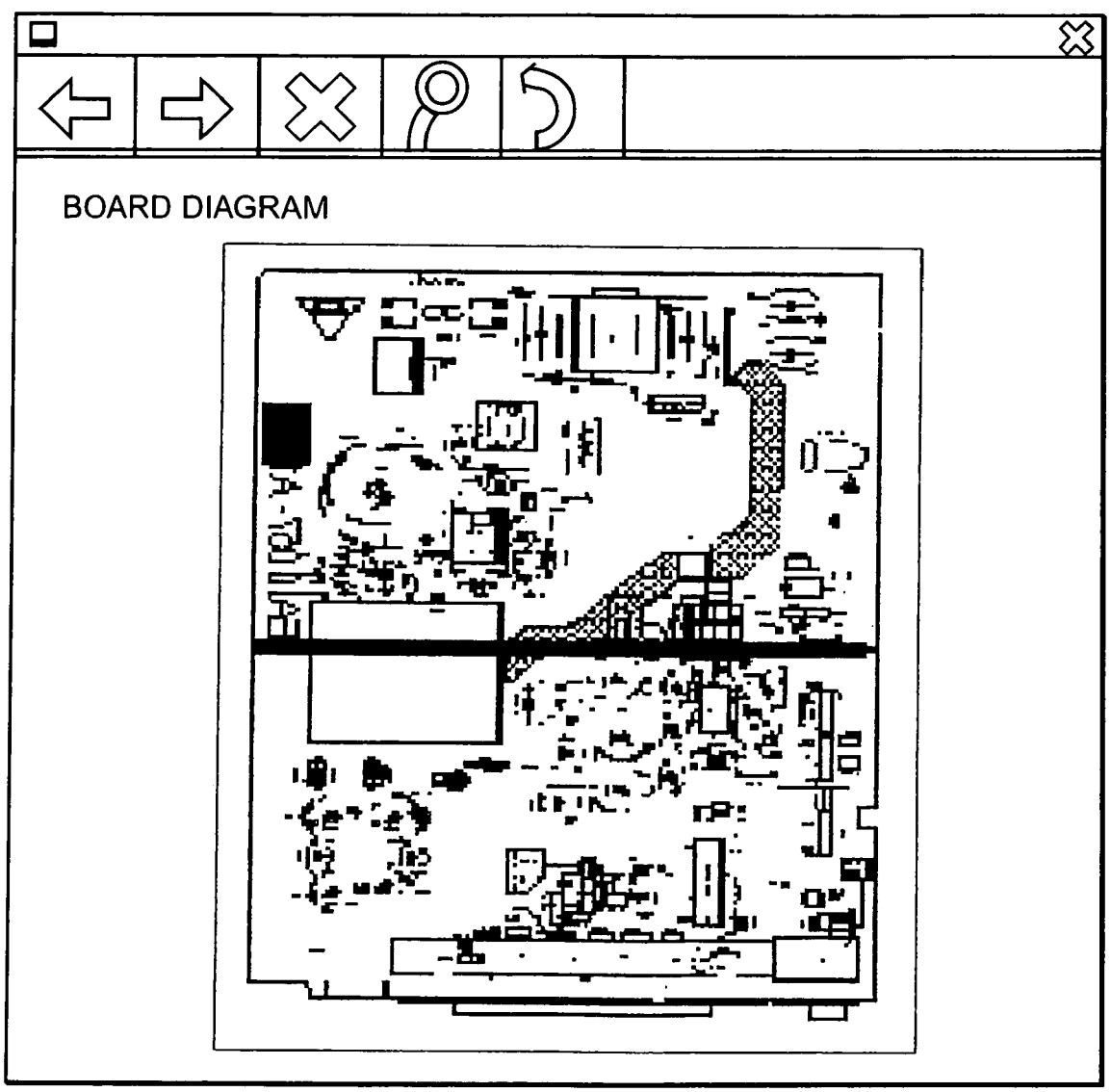
FIG. 14 An example board diagram to be displayed by processing SVG data using the SVG viewer according to the embodiment of the present invention.

Shown in FIG. 12 are an example SVG data structure for circuit diagram data or board diagram data, and the state wherein the SVG data are processed and displayed by the browser 53. Further, shown in FIGS. 13 and 14 are an example circuit diagram and an example board diagram for which display by the SVG viewer is enabled by the processing performed for the SVG data. The SVG data structure includes [<script>: definition of a script element], [<z:info>: SVG custom information such as a SVG data name], [<rect>: designation of the range for one set of graphics data] and [<g>: graphics root group to which belong various graphics primitives constituting one set of graphics data]. The graphics root group is formed of a plurality of layers [<g>: layer group], each composed of a plurality of graphics primitives [<g>: graphics primitive group]. A layer also includes lines [<path>: line drawing element] used to form the individual graphics primitives, and various text information [<text>: character element], such as the symbol numbers of parts. It should be noted that the graphics primitives correspond to the parts, such as ICs, resistors and diodes, that constitute circuits.

The SVG data names are written in the SVG custom information for the SVG data structure using the same forms as are used for SVG data names written in the index XML data and the parts table XML data, and the symbol numbers of parts are written in the character elements of the SVG data structure using the same form as are used for symbol numbers written in the parts table XML data. That is, the index XML data, the parts table XML data and the SVG data structure are closely correlated by employing the SVG data names and the symbol numbers for the parts.

In addition to the XML data, SVG data written in the XML data form also serve as a database written in the text form. Therefore, in accordance with a script language such as JavaScript (trademark), a keyword search can be easily performed for both the XML data and the SVG data by using a drawing data name or a symbol number as a keyword. It is especially very useful to employ the above described script language to perform a search of the SVG data for the graphics primitives, which are drawing data. Since the coupling process program can be located outside the contents, electronic service manual producers do not need the operation for the embedding, for example, of hyperlinks during the production of electronic service manuals, so that both the labor expended and the time required for production can be considerably reduced.

Figure 2:
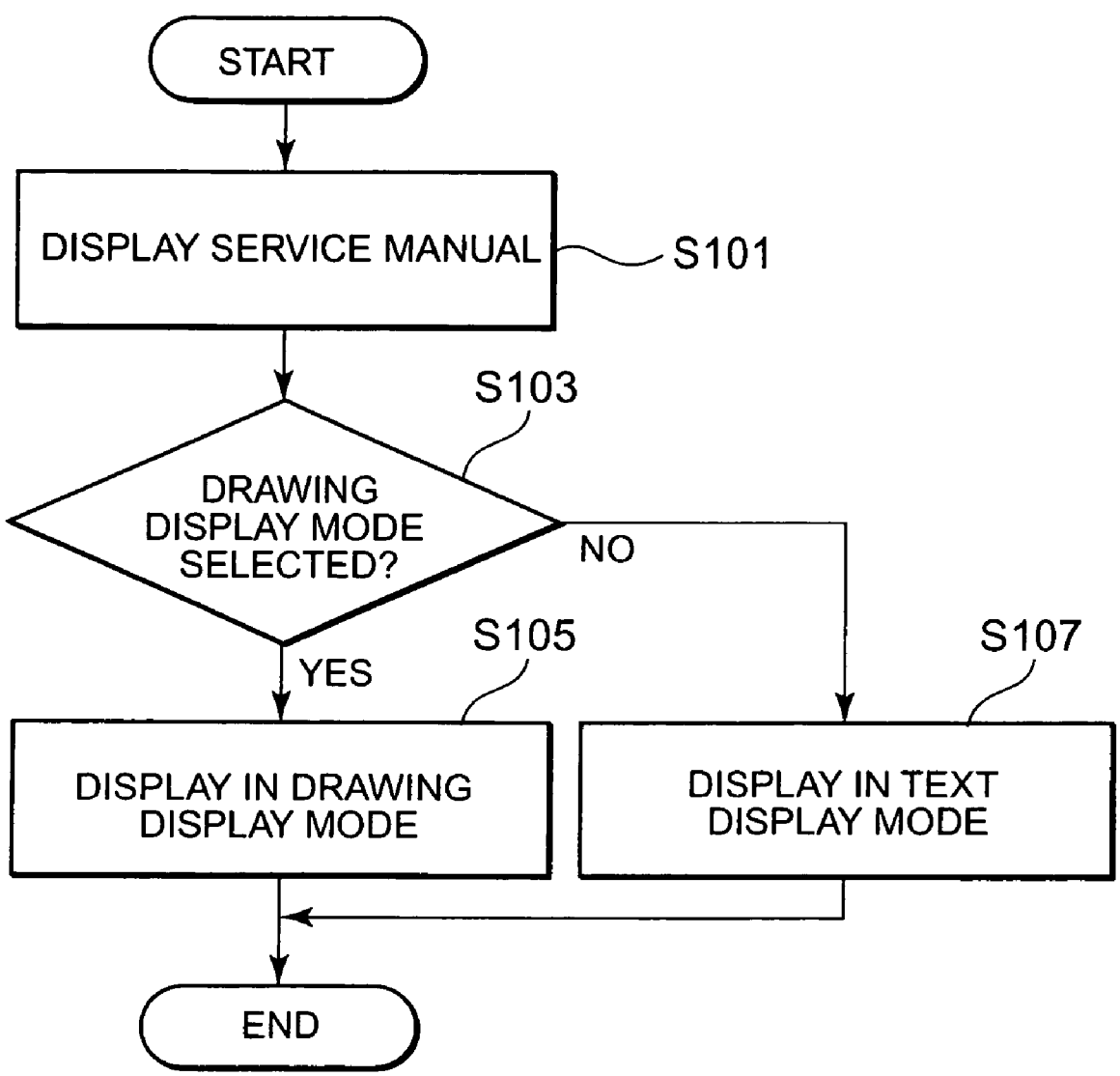
FIG. 2 A flowchart showing an overview of a service manual display operation according to the embodiment of the present invention.

Next, an explanation will be given for the sequential processing performed to display a service manual for a specific model. FIG. 2 is a flowchart showing an overview of the service manual display processing performed according to the embodiment of the present invention. In the following explanation, an example is employed whereby the control program 62 and the contents data 63 required to display a service manual are all stored on and read from, as needed, the CD-ROM 61.

First, while monitoring the display device 3, a user manipulates the operation input means 4, such as a mouse, to select a file corresponding to a desired service manual. For example, a file corresponding to a service manual for a DVD audio/video player, model number A1234, is selected by the operation input means 4, such as a mouse.

Figure 15:
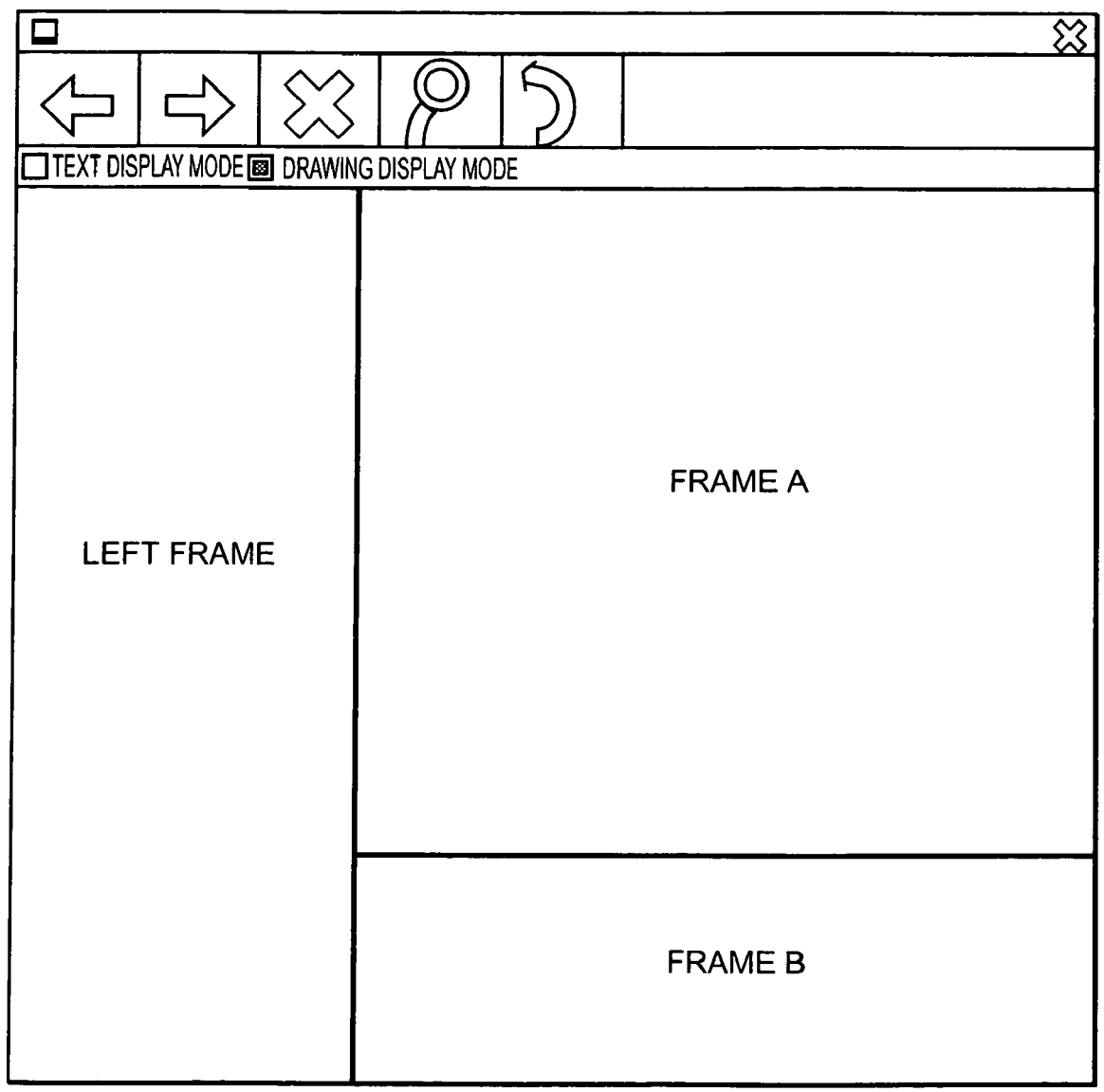
FIG. 15 A diagram showing an example layout (example double-screen mode) for the frame A and a frame B in a browser according to the embodiment of the present invention.

When the user selects the service manual, the PC performs a process for using the browser 53 to display the top page of that service manual on the display device 3 (step S101: Display service manual). At this time, as is shown in FIG. 15 (which will be described later), the area in the browser 53 is divided into two frames (a left frame and a right frame), for example, and the index page for the service manual is displayed in one of the frames (the left frame), while a text page in the service manual is displayed in the other frame (the right frame). It should be noted that as is shown in FIG. 10, the index page is composed of index XML data and predetermined XSL data. And the text page, as are all other pages, is composed of XML text data and predetermined XSL data, and no detailed explanation will be given for the text page.

Further, as an example, buttons for selecting a mode, either a text display mode or a drawing display mode, are displayed on the tool bar of the browser 53. Through a mode selection procedure, for which the mode selection button is used, a user can select either the text display mode or the drawing display mode.

When the drawing display mode is selected by a user ("YES" at step S103), upon the selection of a category on the index page in the left frame, a circuit diagram or a board diagram corresponding to the selected category and information concerning parts included in the circuit diagram, or the board diagram, are displayed in the right frame (step S10S: Present display in drawing display mode).

On the other hand, when the text display mode has been selected by a user ("NO" at step S103), upon the selection of a category on the index page in the left frame, text pages including various captions and drawings corresponding to the selected category are displayed in the right frame (step S107: Present display in text display mode). In this embodiment, since the display is presented in the text display mode at step S101, the text display mode is continued when mode selection is not performed.

Figure 3:
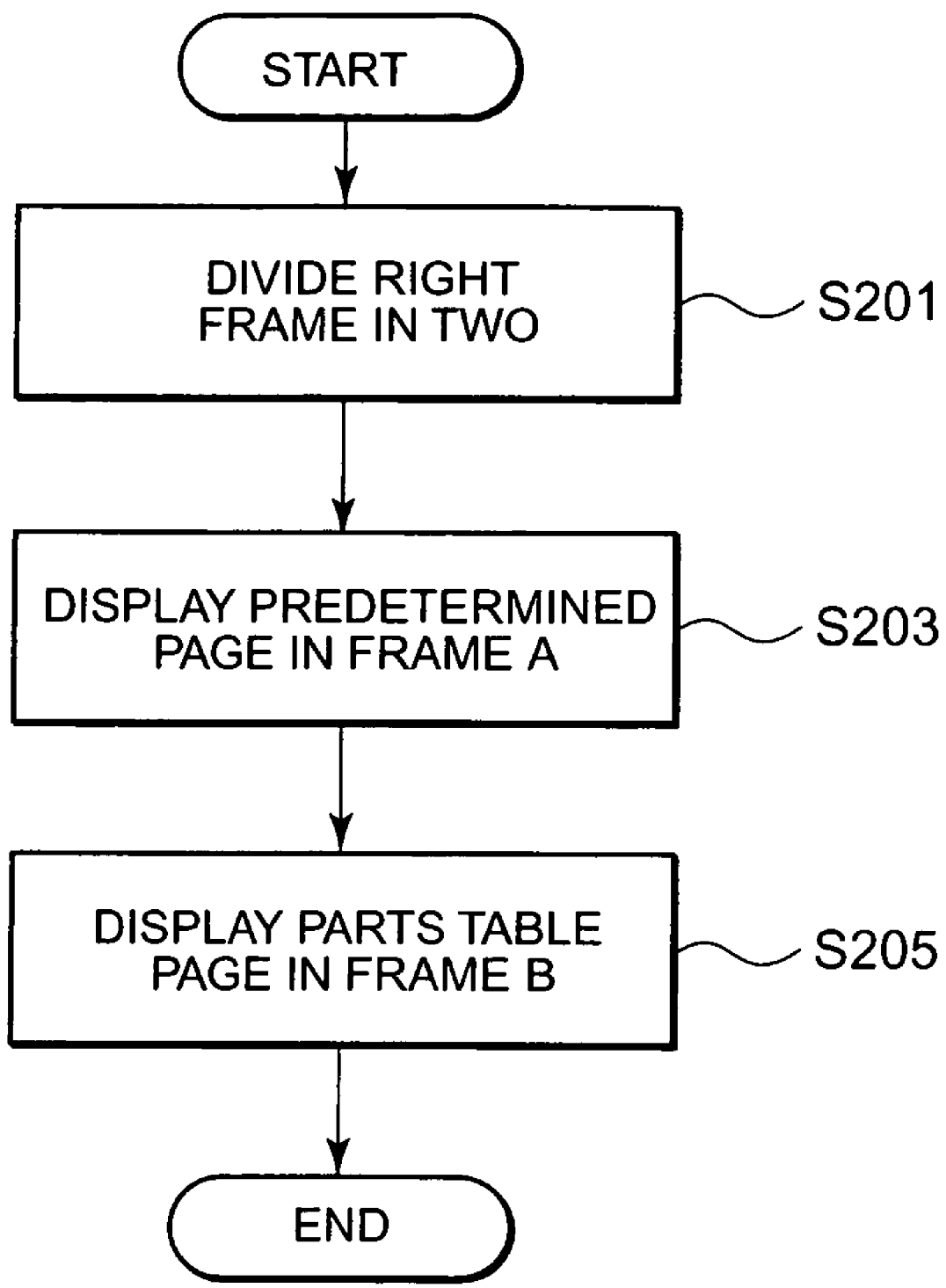
FIG. 3 A flowchart showing an overview of the display processing performed in a drawing display mode according to the embodiment of the present invention.

The drawing display mode will now be described while referring to the flowchart in FIG. 3. FIG. 3 is a flowchart showing an overview of the display processing performed in the drawing display mode according to the embodiment of the present invention. In the drawing display mode, as is shown in FIG. 15, subdivision of the right frame is performed to obtain two frames (frames A and B) (step S201: Divide right frame in two). The frames A and B can be arbitrarily arranged. As an example, the right frame can be divided into an upper and a lower frame, as is shown in FIG. 15. Hereafter, the upper frame in the right frame is called frame A (drawing display area), and the lower frame is called frame B (parts table page display area). A predetermined top page in the drawing display mode is displayed in frame A (step S203: Display predetermined page in frame A), and a parts table page is displayed in frame B (step S205: Display parts table page in frame B). It should be noted that, as is shown in FIG. 11, the parts table page is generated based on parts table XML data and predetermined XSL data.

Figure 4:
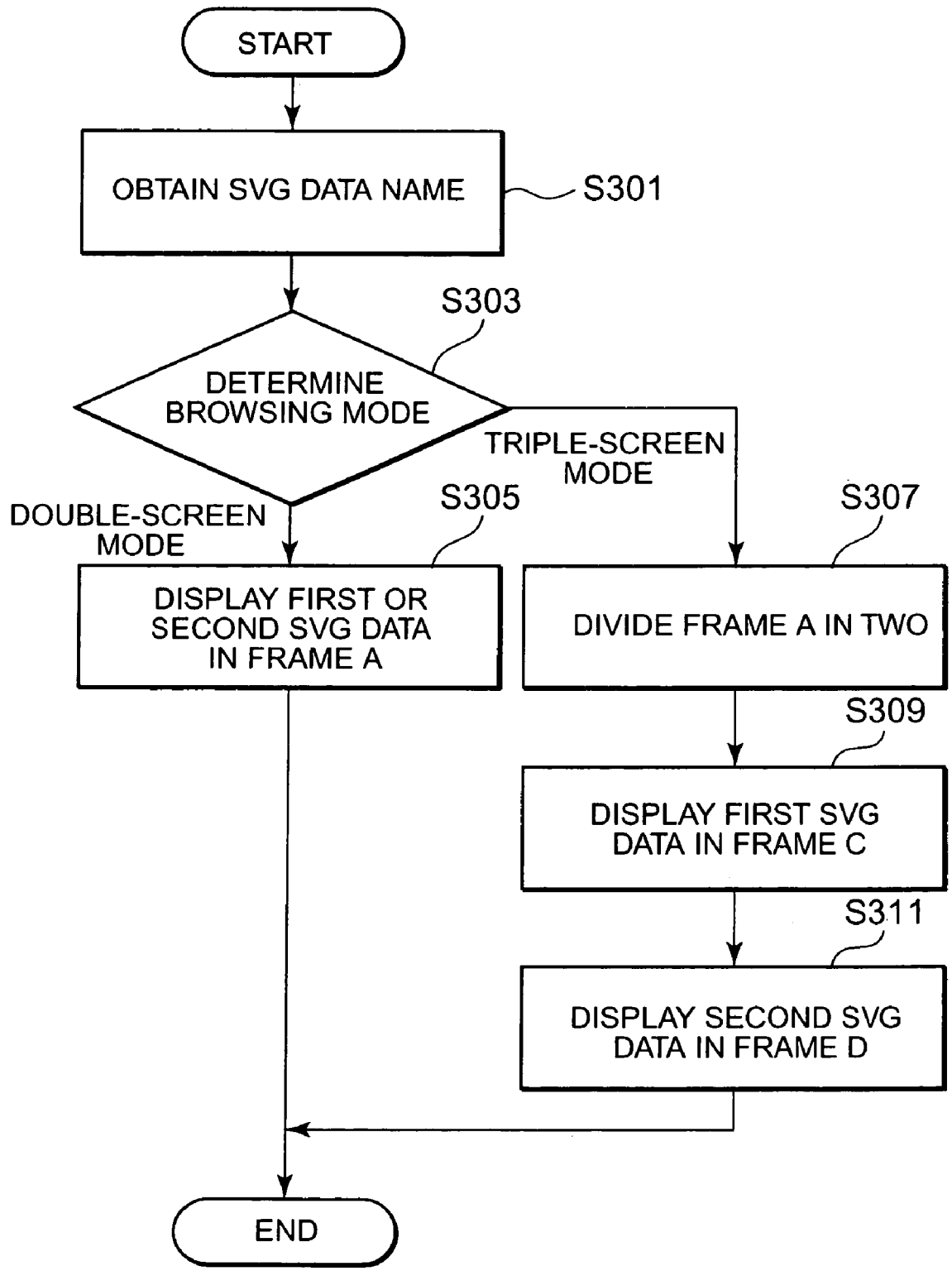
FIG. 4 A flowchart showing an overview of the display processing performed when, in the drawing display mode according to the embodiment of the present invention, a user selects a drawing category on an index page.

While referring to the flowchart in FIG. 4, an explanation will now be given for an overview of the display processing performed when the process at step S205 has been completed and when a user selects a drawing category on the index page displayed in the drawing display mode. FIG. 4 is a flowchart showing an overview of the display processing performed, according to the embodiment of the present invention, when a drawing category on the index page is selected in the drawing display mode.

When the drawing category displayed on the index page is selected by the user, first, the PC examines index XML data and obtains an SVG data name related to the selected drawing category (step S301: Obtain SVG data name), and determines a browsing mode for the selected drawing category (step S303: Determine browsing mode). Various methods are available for obtaining the SVG data name. As an example, the SVG data name can be easily obtained by acquiring the name of a currently displayed file.

The browsing mode designated for each drawing category on the index page is information indicating that the drawing category includes one or both of a circuit diagram and a board diagram, and whether subdivision of the frame A should be performed to obtain two more frames (frames C and D) is determined in accordance with the browsing mode. For example, when the browsing mode is "1", as is shown in index XML data in FIG. 10, two sets of SVG data (first and second SVG data) are present as associated drawings, and in order for these two sets of SVG data to be displayed, subdivision of the frame A should be performed to obtain the two frames C and D in which to display these drawings.

On the other hand, when the browsing mode is "0", only the first SVG data is present as an associated drawing, or when the browsing mode is "3", only the second SVG data is present as an associated drawing and frame subdivision is not required; either the first or the second SVG data need only be displayed in the current frame A. It may also be determined that subdivision of the frame A is not to occur when the number of associated SVG data sets is one, or that subdivision of the frame A is to be performed to obtain the two frames C and D when the number of associated SVG data sets is two, so that the decision at step S303 can be made without the browsing mode being used. In this embodiment, the frame A has been subdivided to obtain the two frames C and D. However, the frame A may, for example, be subdivided in advance to obtain the two frames C and D, so that when the number of associated SVG data sets is one, either frame C or D is not displayed, or when the number of associated SVG data sets is two, both frames C and D are displayed. That is, in accordance with the decision at step S303, whether to display one drawing in frame A or to independently display two drawings is determined.

Figure 16:
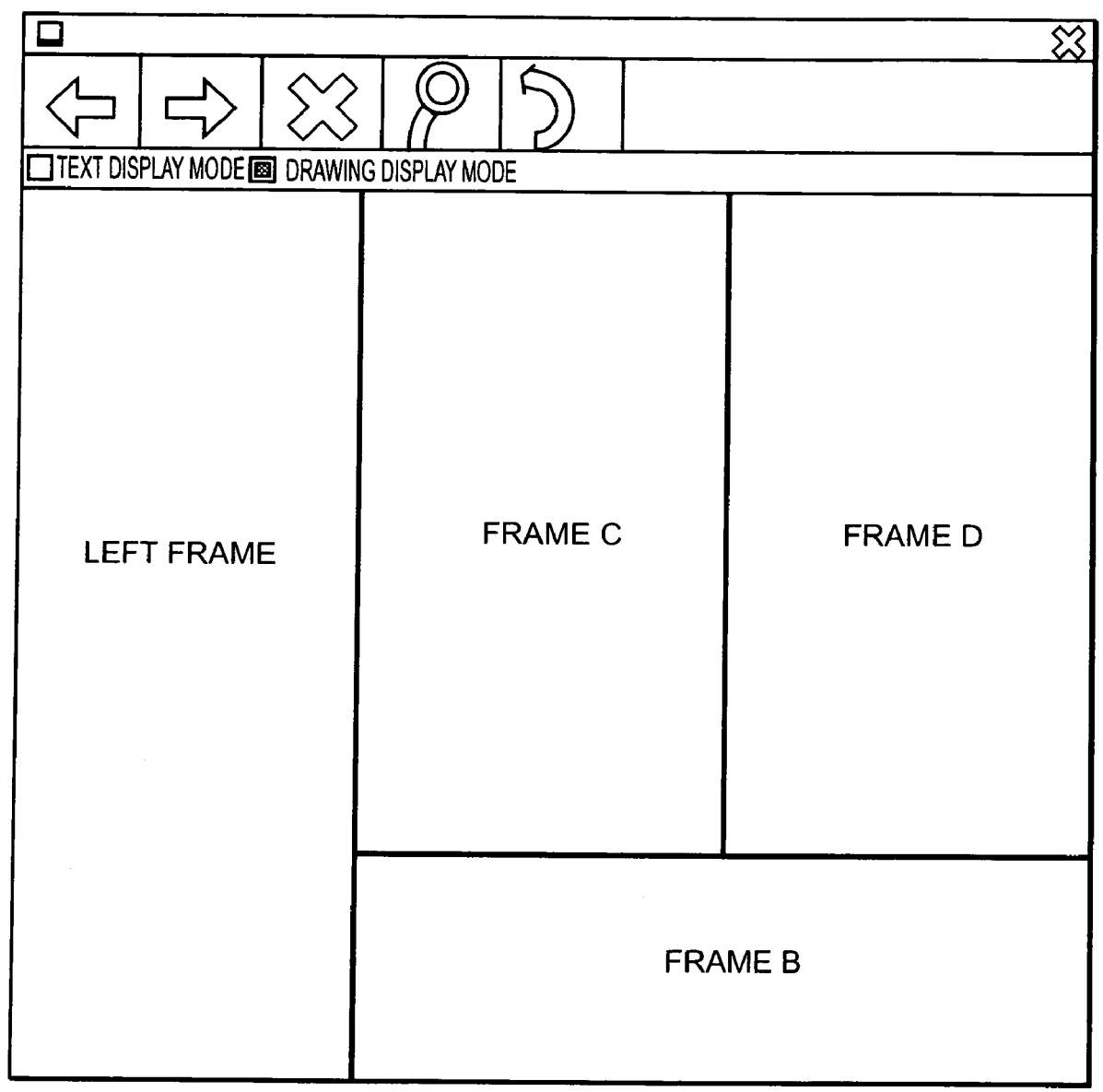
FIG. 16 A diagram showing an example layout (example triple-screen mode) for the frame B, the frame C and the frame D in the browser according to the embodiment of the present invention.

When frame A is subdivided as shown in FIG. 16, three frames, B, C and D, are obtained by dividing the right frame, and hereinafter, the state wherein the three frames B, C and D are obtained is called a triple-screen mode. Further, in comparison with the triple-screen mode, the state wherein frames A and B are obtained by dividing the right frame, but wherein frame A is not subdivided is called a double-screen mode.

As is described above, in accordance with the browsing mode decision at step S303, either the double-screen or the triple-screen mode is determined for the right frame. In the double-screen mode, the first or the second SVG data is displayed in the frame A (step S305: Display first or second SVG data in frame A). In the triple-screen mode, however, frame A is subdivided to obtain two frames (frames C and D) (step S307: Divide frame A in two). The layout of the frames C and D is arbitrary, and in this embodiment, as an example, frame A is divided into left and right frames, as is shown in FIG. 16, and the first SVG data are displayed in the left frame C (step S309: Display first SVG data in frame C), while the second SVG data are displayed in the right frame D (step S311: Display second SVG data in frame D).

Figure 17:
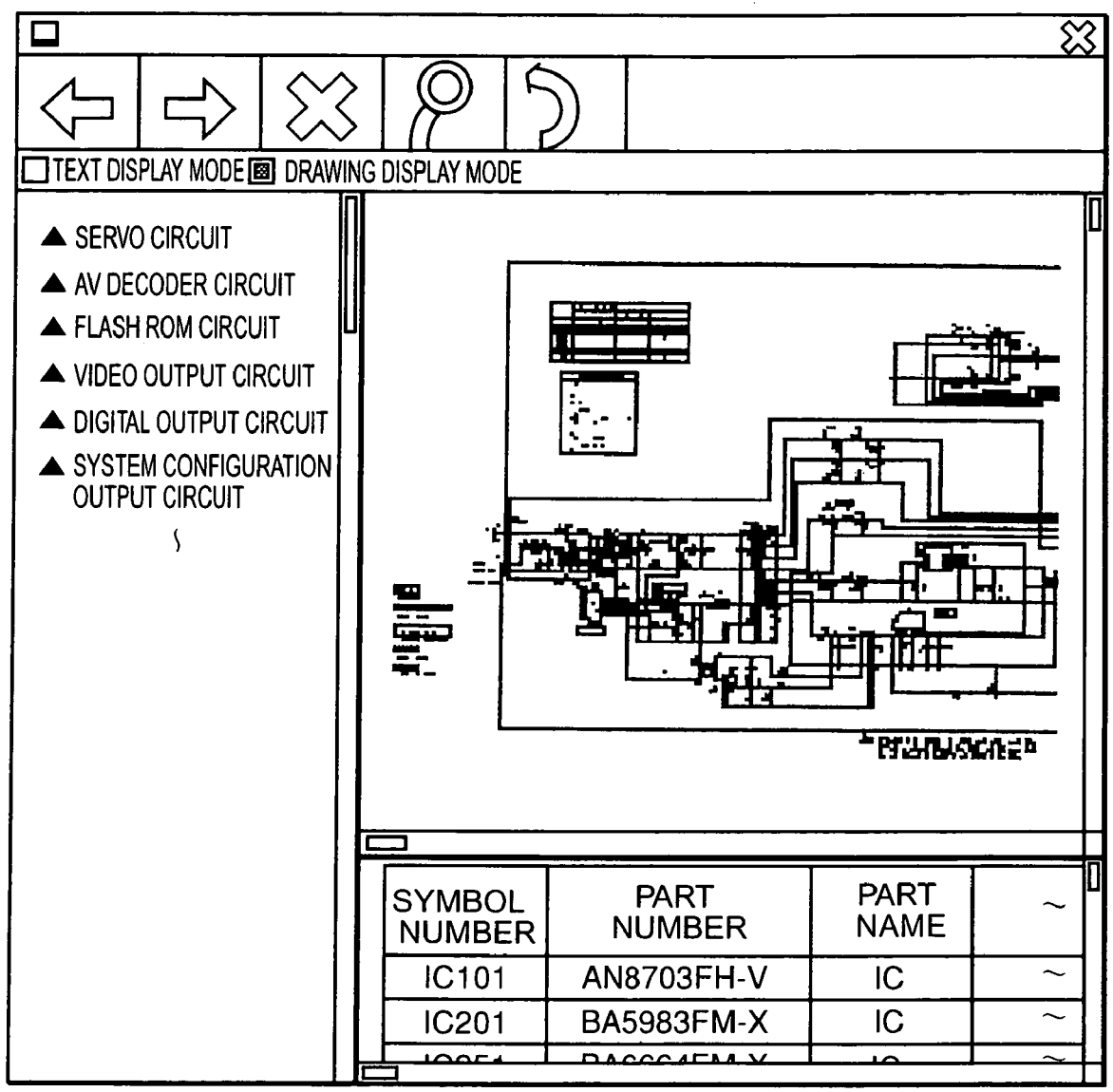
FIG. 17 A diagram showing an index page in the left frame of the browser, a circuit diagram in the frame A and a parts table in the frame B in the double-screen mode according to the embodiment of the present invention.
Figure 18:
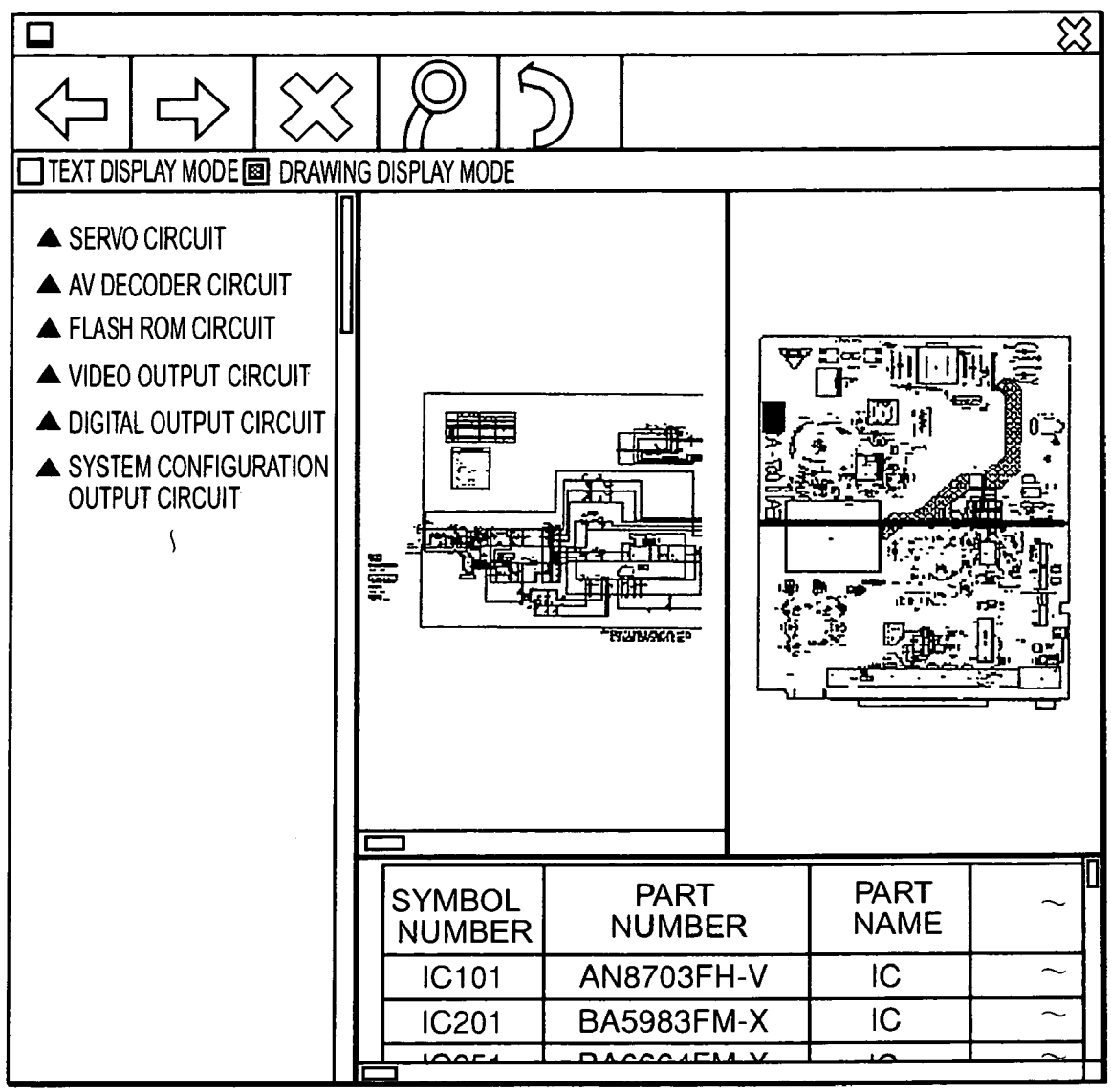
FIG. 18 A diagram showing an index page in the left frame of the browser, a circuit diagram in the frame C, a board diagram in the frame D and a parts table in the frame B in the triple-screen mode according to the embodiment of the present invention.

When a drawing category is selected on the index page in this manner, the browsing mode for the drawing category is identified. And when the browsing mode is the double-screen mode, as is shown in FIG. 17, the first or the second SVG data (a board diagram or a circuit diagram) and the parts table page for the selected drawing category can be displayed in the right frame. On the other hand, when the browsing mode is the triple-screen mode, as is shown in FIG. 18, the first SVG data (circuit diagram), the second SVG data (board diagram) for the selected drawing category and the parts table page can be displayed in the right frame.

Figure 5:
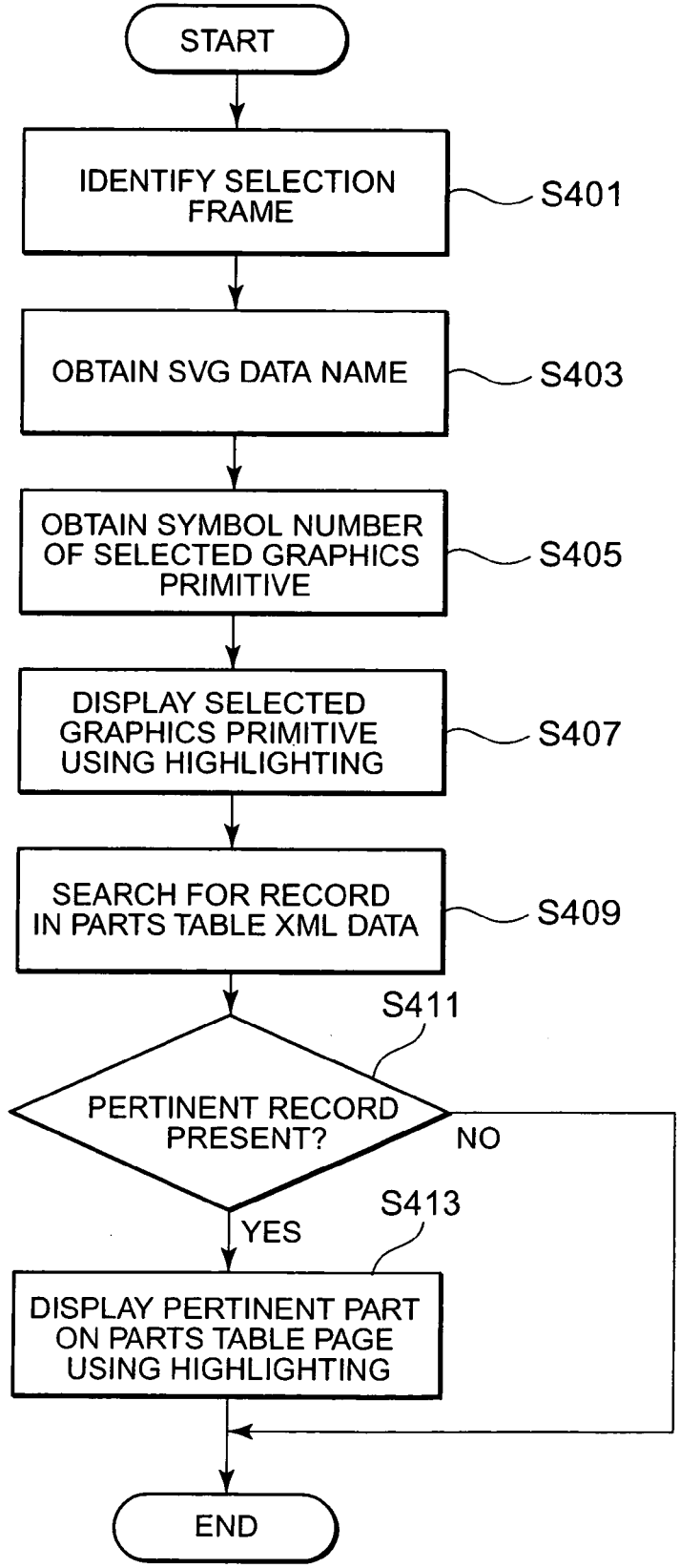
FIG. 5 A flowchart showing the processing performed when a graphics primitive is selected in a drawing displayed in a frame A under the display conditions for a double-screen mode according to the embodiment of the present invention.

Sequentially, an explanation will be given for the processing performed when a graphics primitive is selected in a drawing displayed in the right frame in either the double-screen mode or the triple-screen mode. First, the processing performed when a graphics primitive is selected in the double-screen mode will be explained. FIG. 5 is a flowchart showing the processing performed, according to the embodiment of the present invention, when a graphics primitive is selected in a drawing displayed in frame A in the double-screen mode.

When a user selects a graphics primitive from SVG data (a circuit diagram or a board diagram) displayed in the frame A in the double-screen mode, first, the PC identifies the frame wherein the graphics primitive was selected (step S401: Identify selection frame). Since in the double-screen mode SVG data is displayed only in frame A, the selection frame is identified as frame A. Then, the name of the SVG data that include the selected graphics primitive (step S403: Obtain SVG data name) and the symbol number of the selected graphics primitive are obtained (step S405: Obtain symbol number of selected graphics primitive).

Thereinafter, in the double-screen mode, a graphics primitive that is displayed in the frame A and has the same symbol number as the selected graphics primitive is highlighted (step S407: Highlight selected graphics primitive). That is, through this processing, the graphics primitive selected by the user is highlighted on display. It should be noted that highlighting enables a user to easily identify a selected graphics primitive, by, for example, changing the color of the selected graphics primitive, or by causing the selected graphics primitive to blink.

Following this, parts table XML data are examined based on the SVG data name, which includes the selected graphics primitive and its symbol number, so as to search for a record that has both the symbol number and the SVG data (step S409: Search for record in parts table XML data).

When, as the result of the search at step S409, a pertinent record is found to be present in the parts table XML data ("YES" at step S411), the entry on the parts table page for the pertinent part is moved to a layout position where it can be easily read by the user (for example, the topmost portion of the frame B), and is displayed using highlighting (step S413: Highlight pertinent part on parts table page). It should be noted, that as well as the highlighting of a graphics primitive, the highlighting, on the parts table page, of the entry for the pertinent part enables the user to easily identify it, and that either the color of the entry for the pertinent part is changed, or the entry for the pertinent part blinks.

Although the parts table XML data should include records for all the parts included in the circuit and board diagrams, the possibility exists that the pertinent record may not be present in the parts table data, e.g., wherein a component other than a part is selected as a graphics primitive (e.g., wherein a signal line that connects parts is selected). When the pertinent part is not present in the parts table XML data, as in the above case ("NO" at step S411), highlighting of an item on the parts table page is not performed and the processing is thereafter terminated.

In this manner, a selected graphics primitive in a board or a circuit diagram can be highlighted in the frame A displayed in the double-screen mode, and the entry, on the parts table page, of a part corresponding to the selected graphics primitive can be highlighted in frame B.

Figure 6:
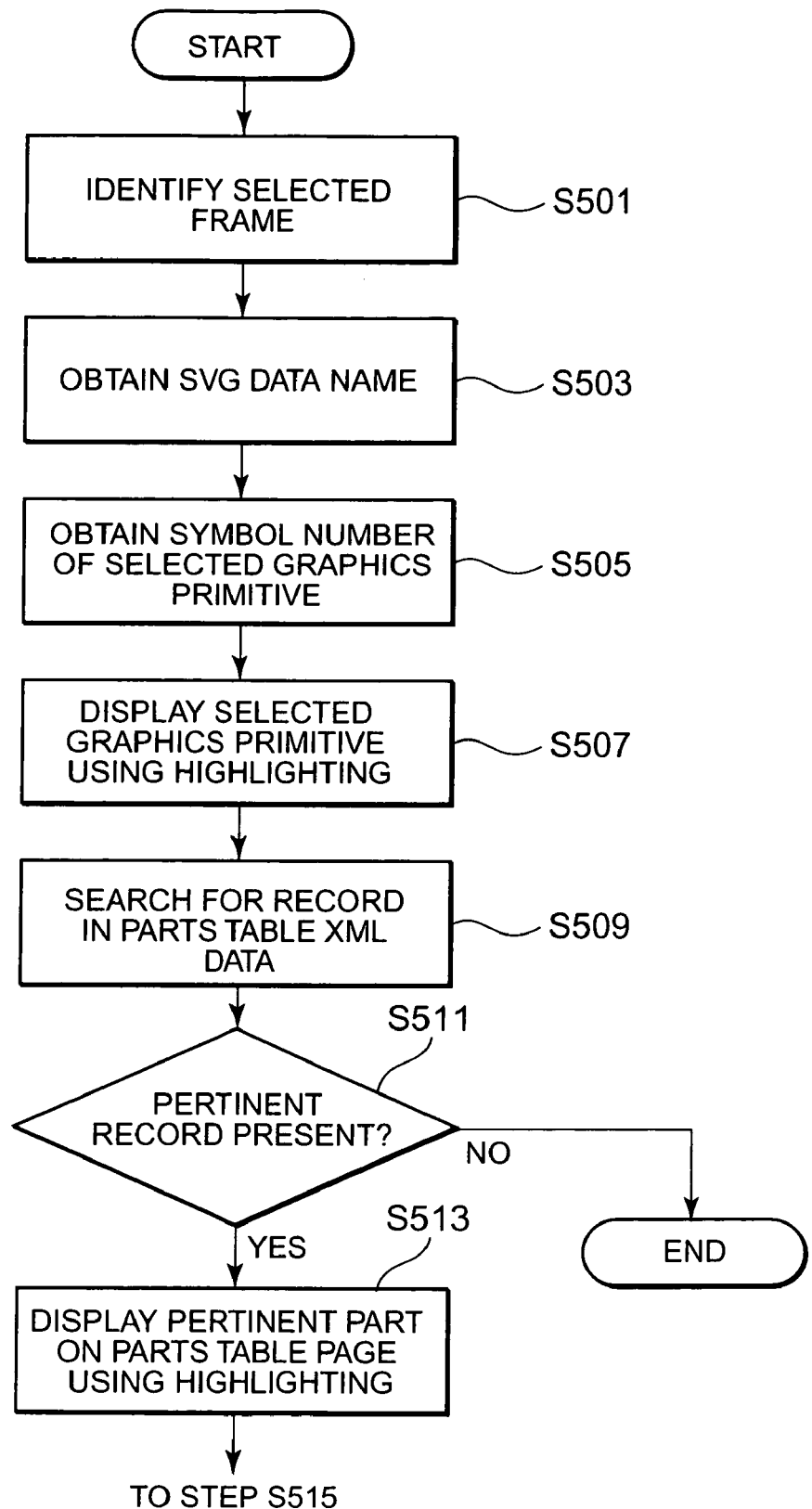
FIG. 6 A first page for a flowchart showing the processing performed when a graphics primitive is selected in a drawing displayed in a frame C or a frame D under the display conditions for a triple-screen mode according to the embodiment of the present invention.
Figure 7:
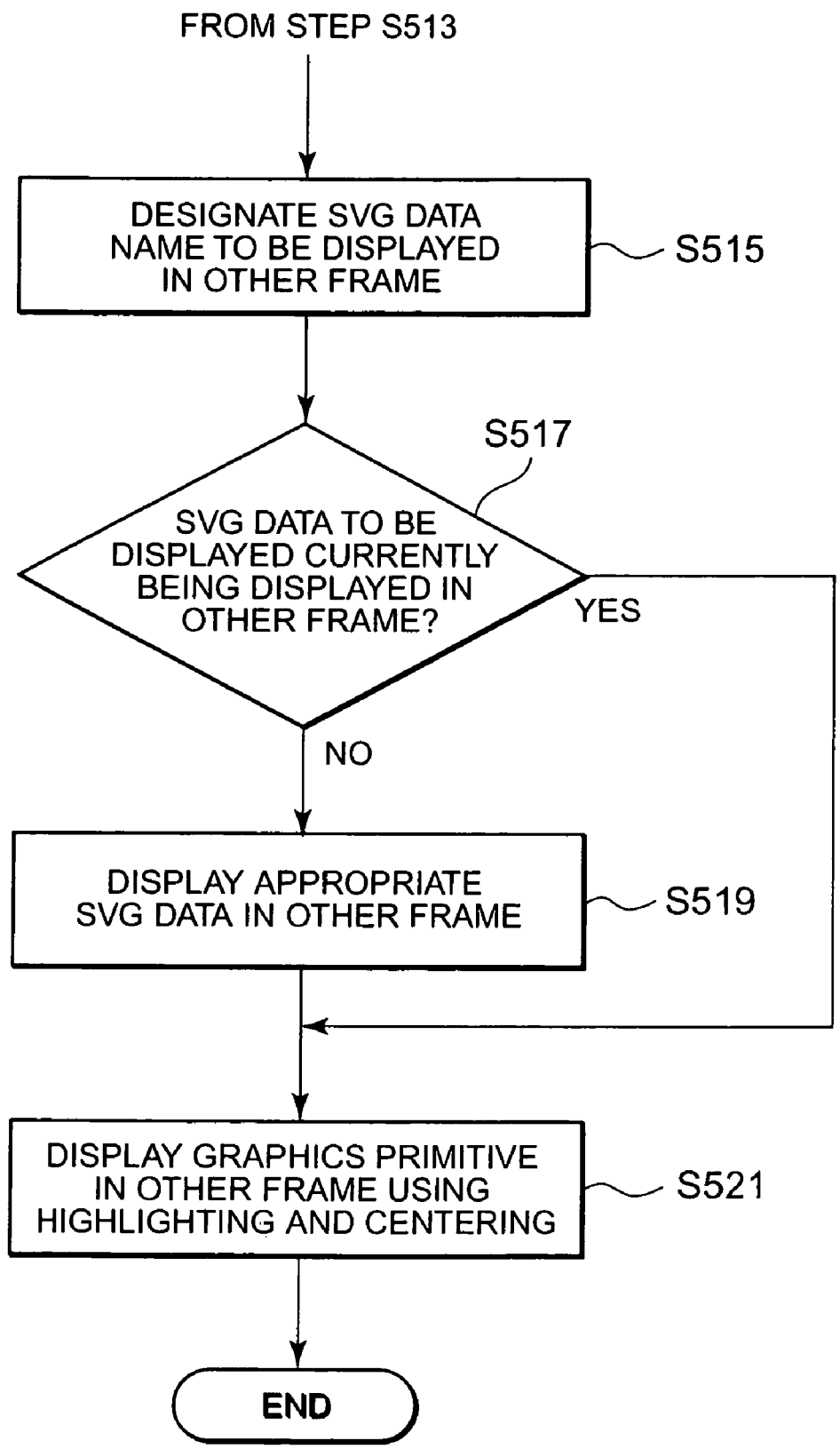
FIG. 7 A second page for the flowchart showing the processing performed when a graphics primitive is selected in a drawing displayed in the frame C or the frame D under the display conditions for the triple-screen mode according to the embodiment of the present invention.

An explanation will now be given for the processing performed when a graphics primitive is selected in the triple-screen mode. FIGS. 6 and 7 are the first and second pages of a flowchart showing the processing performed when a graphics primitive is selected in a drawing displayed in one of the frames C and D.

When in the triple-screen mode a user uses, for example, a mouse and selects a graphics primitive in the first SVG data (circuit diagram) displayed in the frame C or a graphics primitive in the second SVG data (board diagram) displayed in the frame D, first, the PC identifies the frame wherein the graphics primitive is selected (step S501: Identify selected frame). Since SVG data are displayed both in the frames C and D in the triple-screen mode, it is readily apparent that the selected frame is either the frame C or D.

Then, an SVG data name including the selected graphics primitive is obtained (step S503: Obtain SVG data name), as is the symbol number of the selected graphics primitive (step S505: Obtain symbol number of selected graphics primitive). In the triple-screen mode, graphics primitives are displayed in the selected frame, and a graphics primitive having the same symbol as the selected graphics primitive is displayed using highlighting (at step S507: Highlight selected graphics primitive). That is, through this process, the selected graphics primitive displayed in the frame (either the frame C or D) that includes the selected graphics primitive is highlighted.

Following this, parts table XML data are examined based on the SVG data name, which includes the selected graphics primitive, and the symbol number of the selected graphics primitive, so as to search for a record that includes both the symbol number and the SVG data name (step S509: Search for record in parts table XML data).

When, as a result of the search at step S509, the pertinent record is found to be present in the parts table XML data ("YES" at step S511), the entry for the pertinent part in the parts table page is moved to a layout position where it can be easily read by the user (e.g., the topmost in the frame B), and where it is displayed and highlighted (step S513: Highlight pertinent part on part table page). On the other hand, when the pertinent record is not present in the parts table XML data ("NO" at step S511), a presentation that includes highlighting is not provided for the parts table page, and the processing is thereafter terminated.

In this embodiment, the same processing as in the double-screen mode has been performed, and in the triple-screen mode, a graphics primitive that is displayed in a frame differing from the frame including the selected graphics primitive must be highlighted. However, there is a case wherein a graphics primitive selected in one frame is not included in a drawing displayed in the other frame. That is, graphics primitives included in drawings displayed in the two frames C and D do not always correspond to each other. For example, for a high-density PCB (Print Circuit Board), a plurality of circuits are mounted on a single board, and N circuit diagrams may correspond to one board diagram. Therefore, when a graphics primitive is selected in a board diagram, a check is performed to determine whether the selected graphics primitive is included in a currently displayed circuit diagram. When the selected graphics primitive is not included in a currently displayed circuit diagram, a circuit diagram that includes the selected graphics primitive must be searched for and displayed, and highlighting and centering must be employed to display a graphics primitive included in the circuit diagram. A centering display here means that the circuit diagram is displayed in the frame, so that the graphics primitive is presented near the center in the frame, which is a layout position that a user can easily see (hereinafter, the centering display is also employed with the meaning that the drawing is so displayed that the graphics primitive is presented near the center of the frame).

At step S513, highlighting is employed for the display of the pertinent part on the parts table page, and then an SVG data name differing from the SVG data name obtained at step S503 is designated (at step S515: Designate SVG data name to be displayed in other frame). That is, at step S515, it is designated that SVG data be displayed in a frame different from the frame wherein the graphics primitive was selected.

Thereafter, a check is performed to determine whether the SVG data that is currently displayed in the other frame (the frame D when a graphics primitive is selected from a drawing displayed in the frame C, or the frame C when a graphics primitive is selected from a drawing displayed in the frame D), which is a different frame from the one wherein the graphics primitive was selected, is the same as the SVG data designated at step S515 (step S517: SVG data to be displayed currently being displayed in other frame?). When the currently displayed SVG data is not the same as the SVG data to be displayed, the SVG data designated at step S515 is displayed in the different frame from the one wherein the graphics primitive was selected (step S519: Display appropriate SVG data in other frame). Then, for the SVG data displayed at step S519, a graphics primitive having the same symbol number as the selected graphics primitive is displayed, highlighted, and is also displayed, centered, in the different frame (other frame) from the one wherein the graphics primitive was selected (step S521: Display graphics primitive in other frame using highlighting and centering).

In this manner, in the triple-screen mode, a graphics primitive, which has been selected in a board diagram or a circuit diagram displayed in either the frame C or D, is highlighted and displayed, and in the other frame, the same graphics primitive as the selected graphics primitive is displayed using highlighting and centering. Further, the entry for a part that is shown on the parts table page display and that corresponds to the selected graphics primitive can be highlighted and displayed in the frame B.

Figure 8:
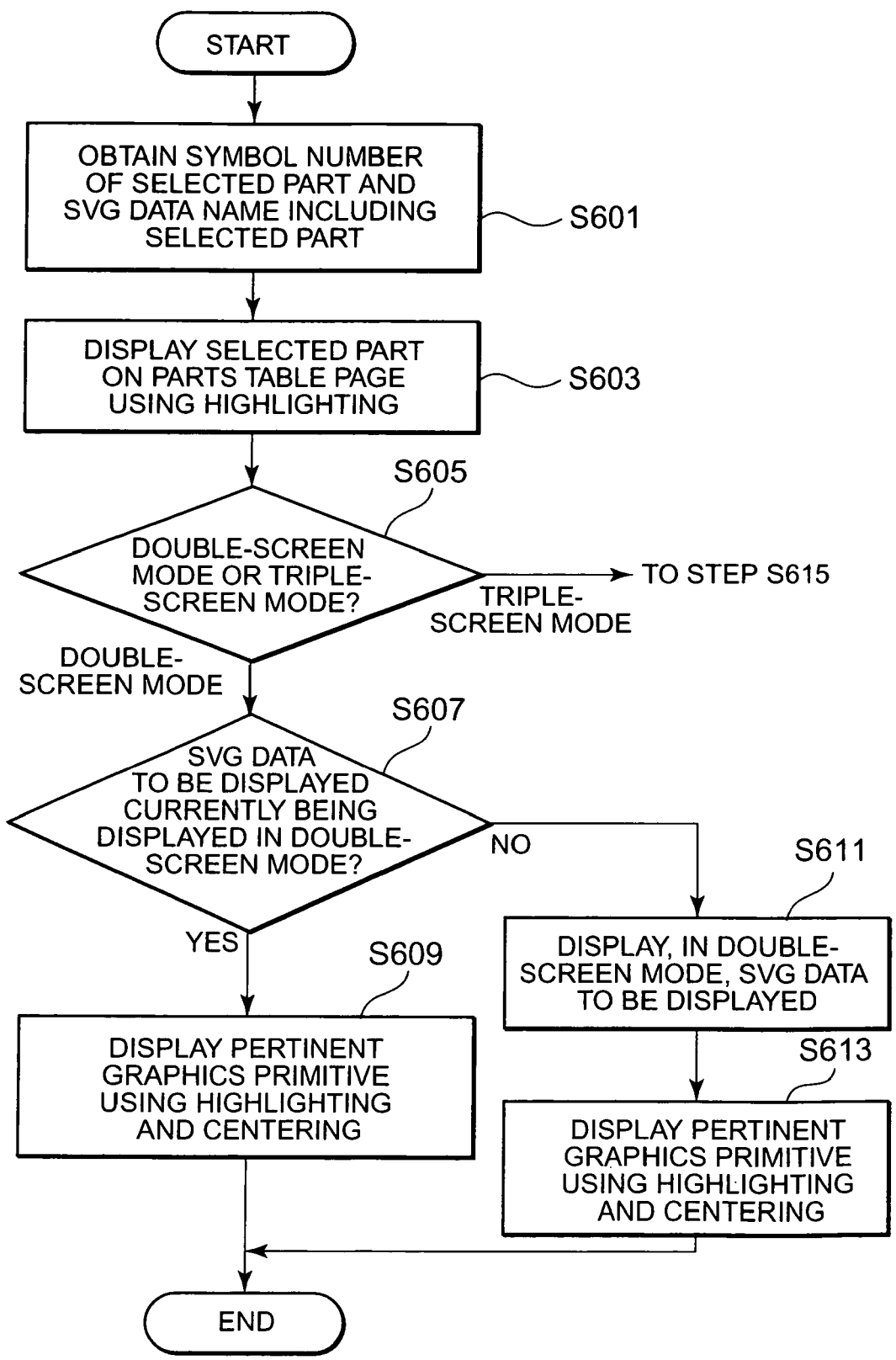
FIG. 8 A first page of a flowchart showing an overview of the display processing performed, according to the embodiment of the present invention, when a user selects a part on a parts table page in the drawing display mode.
Figure 9:
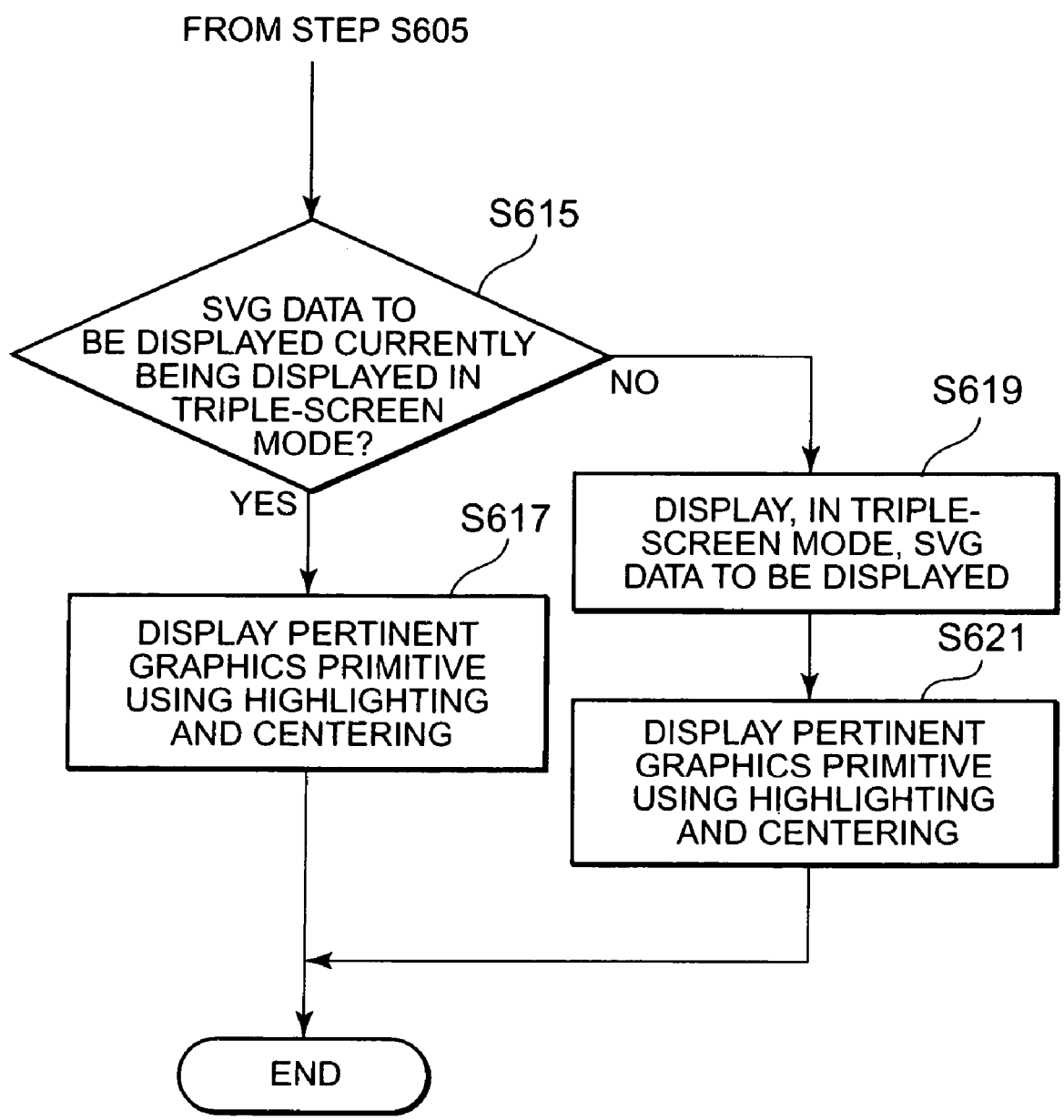
FIG. 9 A second page of the flowchart showing the overview of the display processing performed, according to the embodiment of the present invention, when the user selects a part on the parts table page in the drawing display mode.

An explanation will now be given for the processing performed when a specific part is selected on the parts table page shown in the frame B. FIGS. 8 and 9 are the first and second pages of a flowchart showing an overview of the display processing performed, according to the embodiment of the present invention, when a user selects a part on the parts table page in the drawing display mode.

When a user uses, for example, a mouse and selects a part on the parts table page displayed in the frame B, first, the PC examines parts table XML data and obtains the symbol number of the selected part and the SVG data name in the record for this part (step S601: Obtain symbol number of selected part and SVG data name including selected part). Further, the entry for the part selected on the parts table page is highlighted (step S603: Highlight selected part on parts table page).

There are cases wherein only one set of SVG data is entered in the record for the selected part, and wherein two sets of SVG data are entered. When only one set of SVG data is entered, it is determined that the double-screen mode should be used to display a drawing that includes the part ("Double-screen mode" at step S605). When two sets of SVG data are entered, it is determined that the triple-screen mode should be used to display a drawing that includes the part ("Triple-screen mode" at step S605).

When it is determined at step S605 that the double-screen mode should be used to display the drawing, a check is performed to determine whether the SVG data designated at step S601 is currently being displayed in the double-screen mode (step S607: SVG data to be displayed being currently displayed in double-screen mode?). When the SVG data designated at step S601 are currently being displayed in the double-screen mode ("YES" at step S607), highlighting and centering are used to display a graphics primitive having the symbol number of the selected part (step S609: Display pertinent graphics primitive by highlighting and centering). Whereas, when the SVG data designated at step S601 are not being displayed in the double-screen mode ("NO" at step S607), the double-screen mode is used to display the SVG data (step S611: Display, in double-screen mode, SVG data to be displayed), and highlighting and centering are used to display a graphics primitive having the symbol number of the selected part (step S613: Display pertinent graphics primitive by highlighting and centering).

When it is determined at step S605 that the drawing should be displayed in the triple-screen mode, a check is performed to determine whether two sets of SVG data designated at step S601 are currently being displayed in the triple-screen mode (step S615: SVG data to be displayed being currently displayed in triple-screen mode?). When the two sets of SVG data designated at step S601 are currently being displayed in the triple-screen mode ("YES" at step S615), highlighting and centering are used to display in the frames C and D a graphics primitive having the symbol number of the selected part (step S617: Display pertinent graphics primitive by highlighting and centering) Whereas, when the two sets of SVG data designated at step S601 are not currently being displayed in the triple-screen mode ("NO" at step S615), the triple-screen mode is used to display the two sets of SVG data (S619: Display, in triple-screen mode, SVG data to be displayed), and highlighting and centering are used to display in the frames C and D a graphics primitive having the symbol number of the selected part (step S621: Display pertinent graphics primitive by highlighting and centering).

An explanation will now be given for a link function whereby, when a display is provided in the double-screen mode or the triple-screen mode (display shown in FIG. 17 or 18) as explained while referring to FIG. 4, information concerning a graphics primitive selected in a drawing is transmitted to an arbitrary Web site. When the link function is employed, a search function, for example, can also be provided whereby parts identification information is transmitted to a search site on the Internet and the search results are received and displayed.

Figure 19:
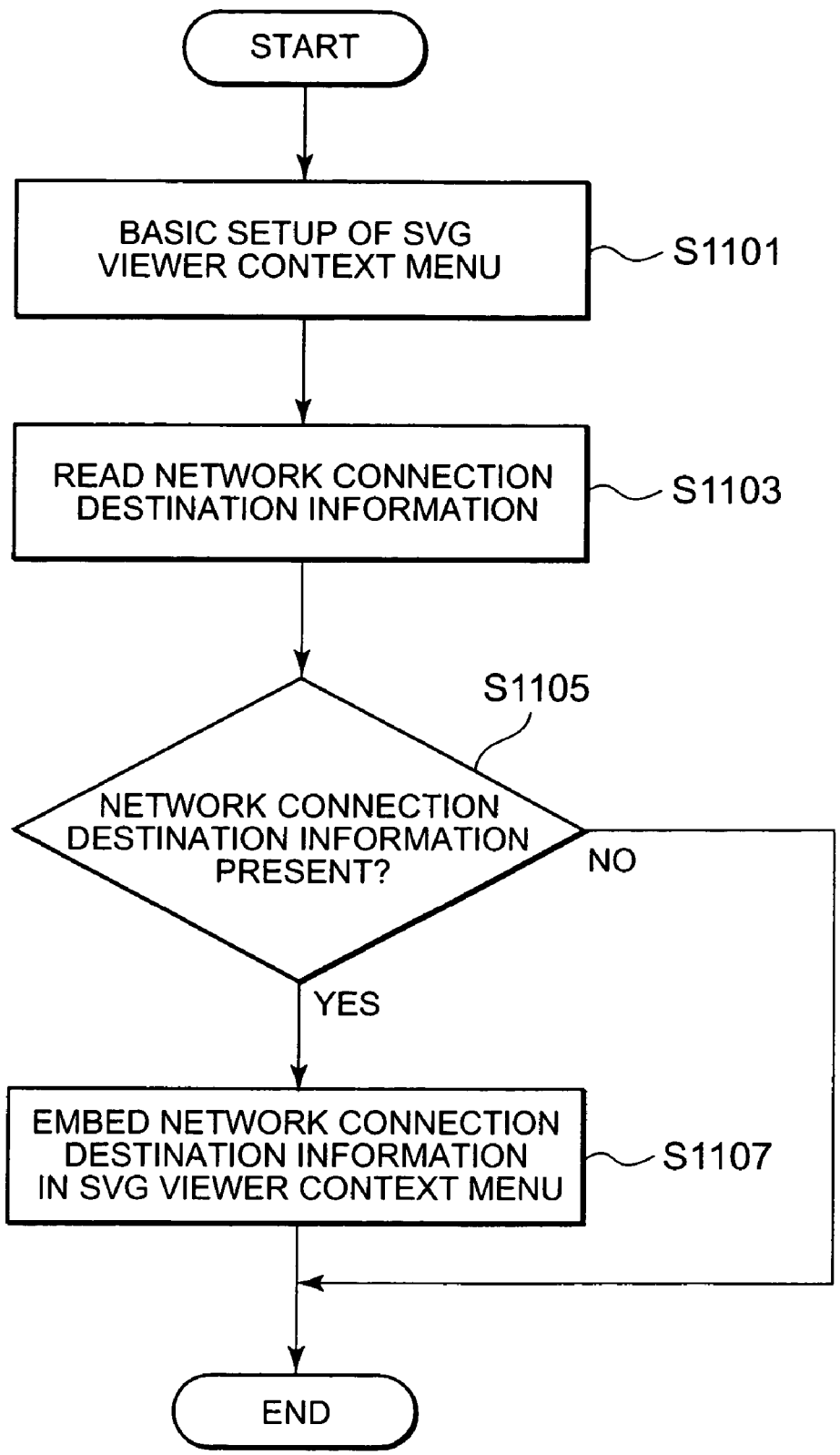
FIG. 19 A flowchart showing the processing for information that is the basis for the generation of an SVG viewer context menu under the display conditions in the double-screen mode or the triple-screen mode according to the embodiment of the present invention.

First, while referring to FIG. 19, an explanation will be given for the generation of an SVG viewer context menu that enables a search for information concerning a graphics primitive selected in a drawing. FIG. 19 is a flowchart showing the processing for information that is the basis for the generation of an SVG viewer context menu under the display conditions in the double-screen mode or the triple-screen mode according to the embodiment of the present invention.

First, a PC displays SVG data in the double-screen mode or the triple-screen mode shown in FIG. 17 or 18, and at the same time, performs a basic setup for an SVG viewer context menu (step S1101: Basic setup of SVG viewer context menu). According to this basic setup, right clicking using a mouse is employed to set up an SVG viewer context menu that is to be displayed when an arbitrary location is designated in a drawing. Specifically, various categories, such as a category that enables switching between an enlargement and a reduction of a drawing, are to be displayed on the SVG viewer context menu.

Then, the PC reads network connection destination information stored in the PC as cookie information (step S1103: Read network connection destination information), and determines whether network connection destination information is present (step S1105: Network connection destination information present?). When network connection destination information is present ("YES" at step S1105), the network connection destination information is embedded in the SVG viewer context menu (step S1107: Embed network connection destination information in SVG viewer context menu). Whereas, when network connection destination information is not present ("NO" at step S1105), there is no network connection destination information to be embedded in the SVG viewer context menu, and no special process is performed.

The network connection destination information will now be explained. FIG. 20 is a diagram showing example network connection destination information according to the embodiment of the present invention. The network connection destination information is, for example, cookie information that is stored in local data storage means, such as the hard disk 5. The network connection destination information includes URL (Uniform Resource Locator) information for a Web site to be connected through the network 71, such as the Internet, and the connection style. Specifically, as is shown in FIG. 20, the network connection destination information includes, for a Web site at each connection destination, a title name (information by which a connection destination can be easily identified), URL information, transmission information, a transmission method, a user ID and a user password.

It is preferable that a database site (parts database site) for parts and a search site on the Internet be set up for the network connection destination information. A history of operating failures for the individual parts and methods for correcting the operation failures are accumulated at the parts database site. Further, information stored in the parts database site and information for personal sites, wherein data concerning parts are open, with good intentions, to the public, are accumulated in the search site.

As the network connection destination information, a user can designate various conventional Web sites, such as a search site and a parts database site, and can also change or correct, as needed, the network connection destination information. Furthermore, the network connection information may be distributed to a PC by the server 72, so that the user does not need to perform the setup.

For each search site and the parts database site, the operation for employing a specific keyword to browse information associated with the keyword is basically the same; however, the mode for performing this operation differs a little. The transmission information, the transmission means, the user ID and the user password are designated in accordance with the operational mode of each Web site.

As the transmission information, a model name, a manual issue number, a symbol number, a part number, a part name and a block number (a number for identifying an entire board or an entire circuit) can be employed. In addition, the type of information requested for a search of a Web site should be appropriately designated in accordance with the Web site indicated by the URL information. For example, when the Web site is a search site, the part number and the part name are to be transmitted, but when the Web site is a parts database site, the symbol number and the part number are to be transmitted.

The GET or POST transmission method is designated as the transmission method. For the GET transmission, the transmission information is transmitted with the URL information for the connection destination, and for the POST transmission, the URL information for the connection destination and the transmission information are transmitted separately. This transmission method should also be appropriately designated in accordance with the Web site. The user ID and the user password are information used when authentication (including anonymous authentication) is required for the use of the Web site at the connection destination.

Since the network connection destination information is embedded in this manner in the SVG viewer context menu, when the user performs a predetermined manipulation (e.g., right clicking using a mouse), various categories, in accordance with the basic setup and the individual Web sites described in the network connection destination information, are displayed on the SVG viewer context menu.

Figure 21:
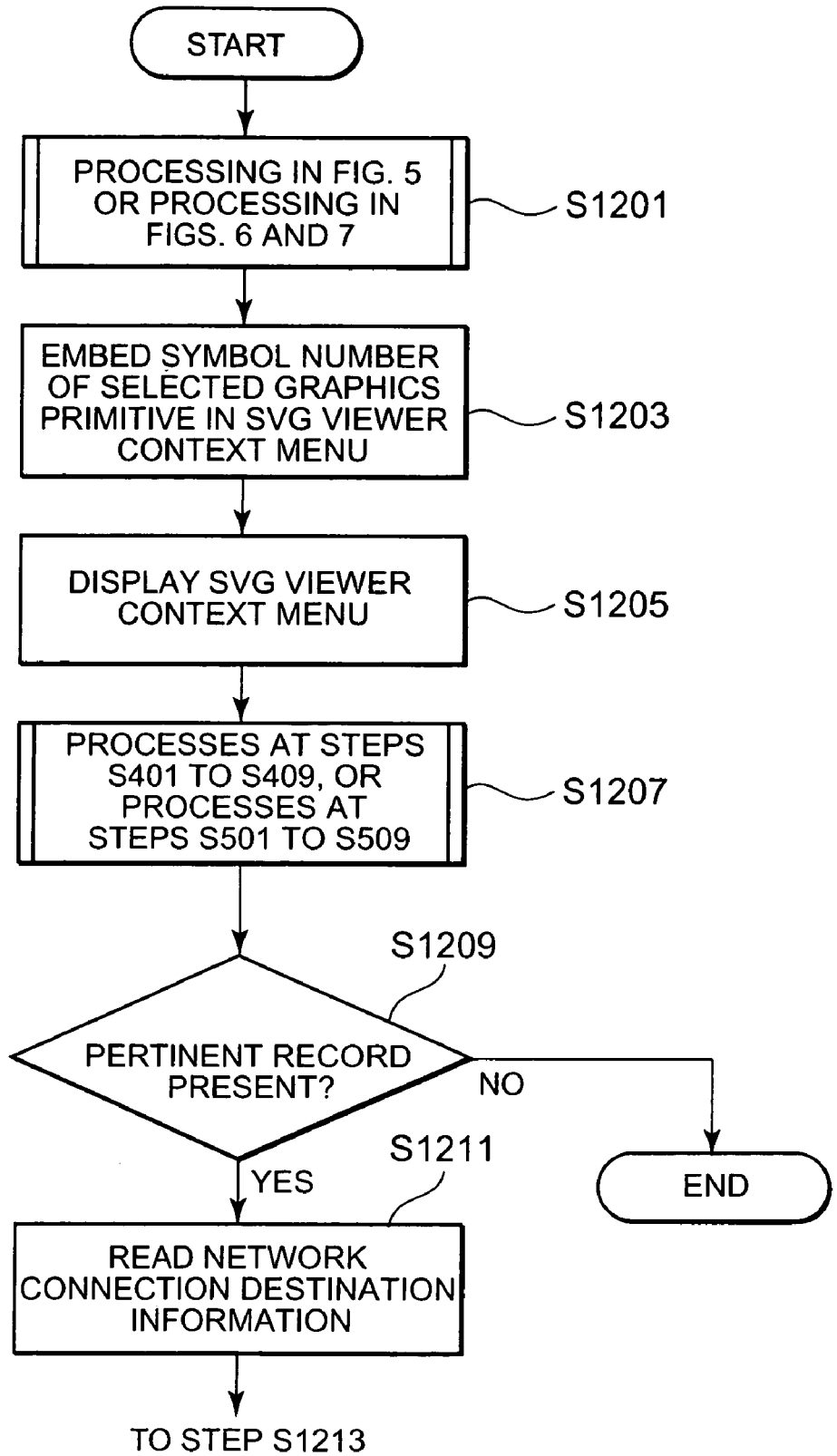
FIG. 21 A first page of a flowchart showing the processing performed to search for a graphics primitive in a drawing that is displayed in either the frame B or the frame C or D under the display conditions in the double-screen mode or the triple-screen mode according to the embodiment of the present invention.
Figure 22:
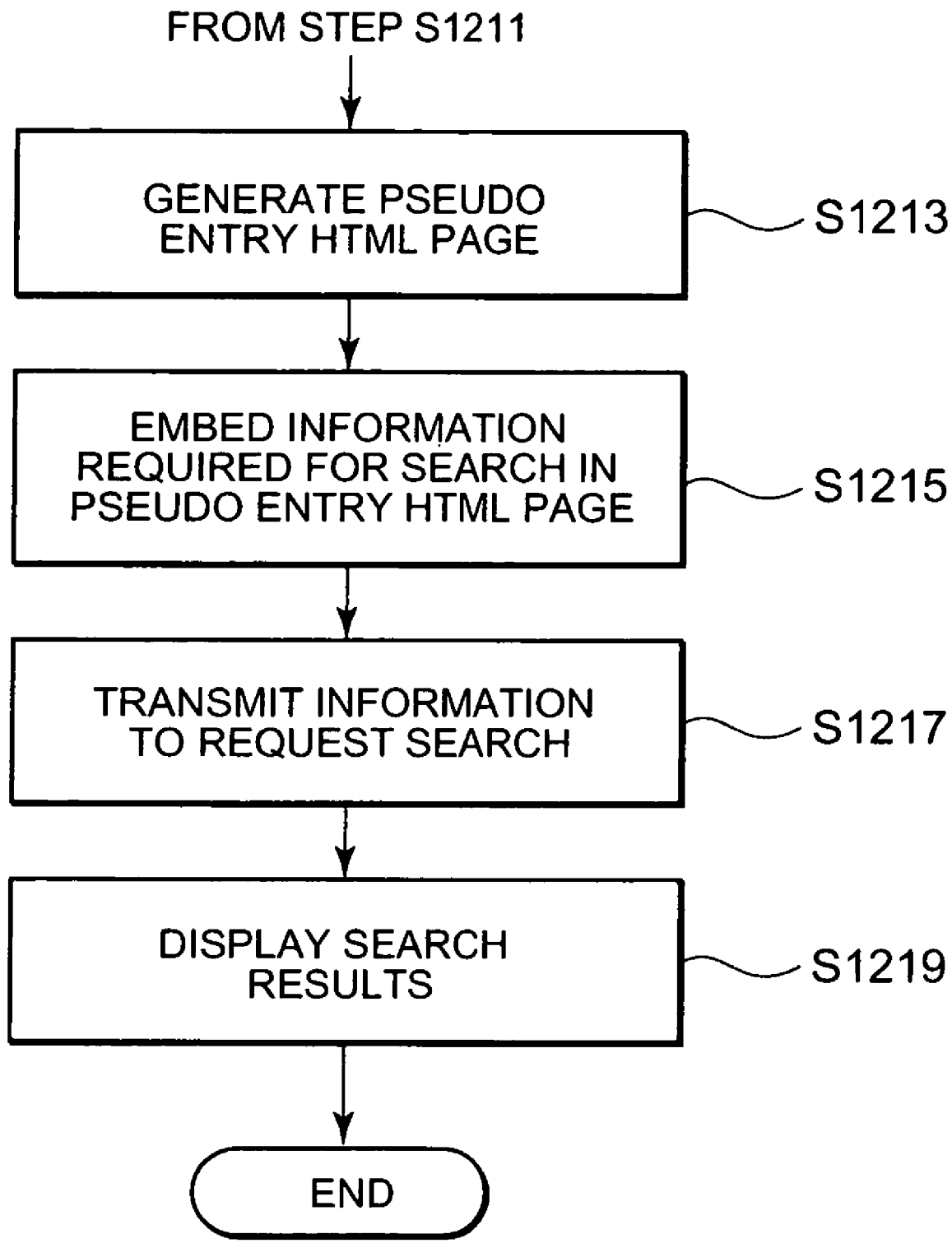
FIG. 22 A second page of the flowchart showing the processing performed to search for a graphics primitive in a drawing that is displayed in either the frame B or the frame C or D under the display conditions in the double-screen mode or the triple-screen mode according to the embodiment of the present invention.

While referring to FIGS. 21 and 22, an explanation will now be given for the search processing for searching for information related to a graphics primitive selected in a drawing while a display (display shown in FIG. 17 or 18) is provided in the double-screen mode or the triple-screen mode. FIGS. 21 and 22 are first and second pages of a flowchart showing the processing performed to search for a graphics primitive in a drawing displayed in either the frame B or the frame C or D under the display conditions in the double-screen mode or the triple-screen mode according to the embodiment of the present invention.

When a user employs a mouse, for example, and selects a graphics primitive in SVG data (a circuit diagram or a board diagram) displayed in either the frame A (double-screen mode) or the frame C or D (triple-screen mode), a PC displays a graphics primitive or a pertinent part on a parts table page using highlighting, as explained while referring to FIG. 5 or FIGS. 6 and 7 (step S1201: Processing in FIG. 5 or processing in FIGS. 6 and 7). Further, information (e.g., a symbol number) concerning the selected graphics primitive is embedded in the SVG viewer context menu (step S1203: Embed symbol number of selected graphics primitive in SVG viewer context menu).

When a manipulation (e.g., right clicking using a mouse) is performed in consonance with the display of an SVG viewer context menu, an SVG viewer context menu, which includes a category for the symbol numbers of graphics primitives, various categories according to the basic setup and a category for individual Web sites described in the network connection destination information, is dynamically generated and displayed on the display device 3 (step S1205: Display SVG viewer context menu).

Figure 23:
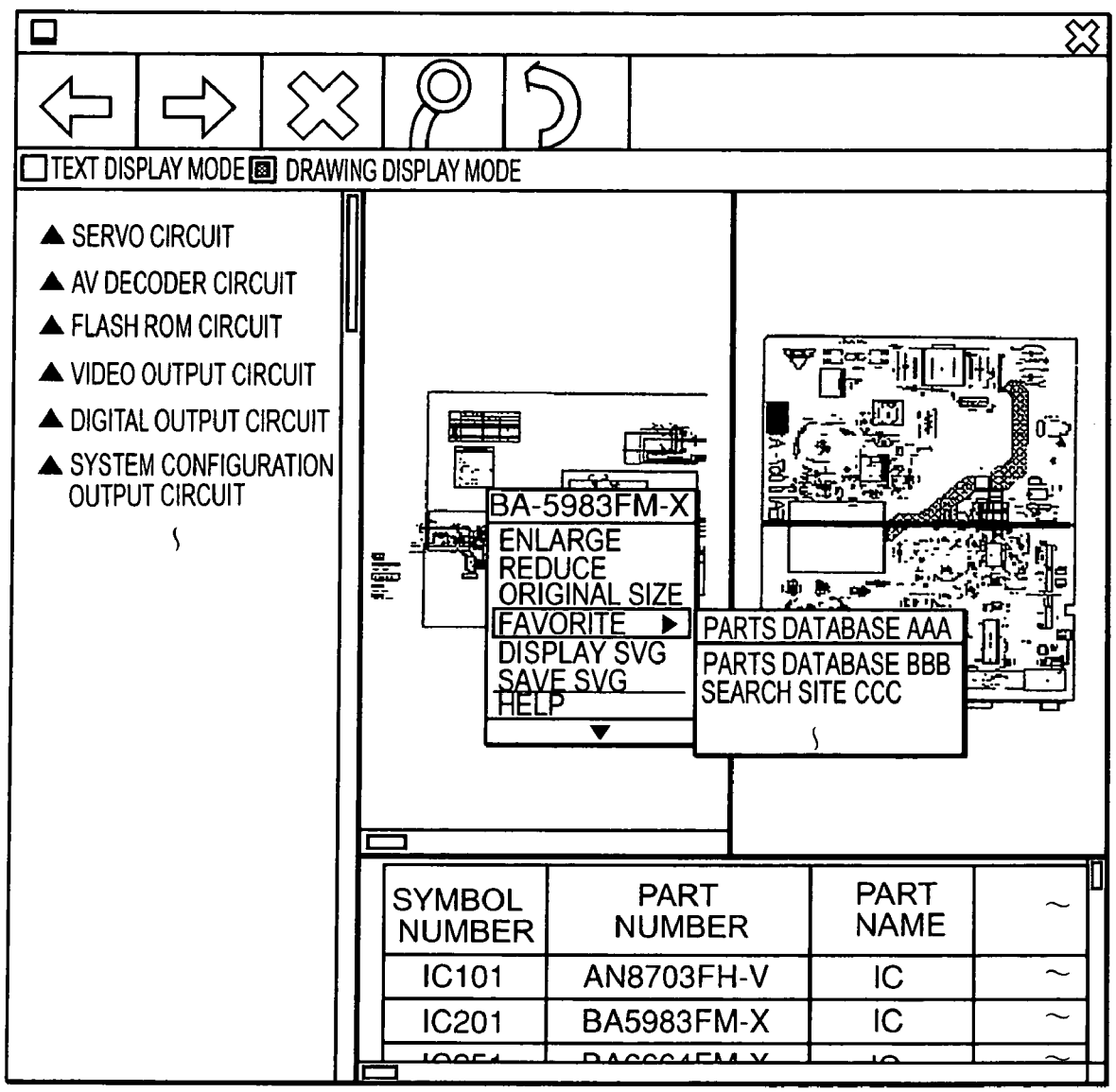
FIG. 23 A diagram showing the state wherein the SVG viewer context menu is displayed on a display device according to the embodiment of the present invention.

FIG. 23 is a diagram showing the state wherein the SVG viewer context menu is displayed on the display device. As is shown in FIG. 23, a category for the symbol numbers of graphics primitives, various categories according to the basic setup and a category for the individual Web sites described in the network connection destination information are displayed in parallel or hierarchically on the SVG viewer context menu. Further, on the SVG viewer context menu in FIG. 23, the Web sites are displayed in the "favorite" category.

When an arbitrary Web site is selected on the SVG viewer context menu, the processes at steps S401 to S409 in FIG. 5 or the processes at steps S501 to S509 in FIG. 6 are performed to examine records in the parts table XML data that corresponds to the selected graphics primitive (step S1207: Processes at steps S401 to S409 or at steps S501 to S509), and whether a pertinent record is present is determined (steps S1209: Pertinent record present?).

When, as the search results at step S1209, the pertinent record is not present in the parts table XML data ("NO" at step S1209), the processing is terminated directly. On the other hand, when as the search results at step S1209 the pertinent record is present in the parts table XML data ("YES" at step S1209), the network connection destination information stored on the hard disk 5 is read as cookie information (step S1211: Read network connection destination information). Then, a pseudo entry HTML page is generated by referring to the URL information and the transmission information that is provided on the SVG viewer context menu in consonance with the selected Web site (step S1213: Generate pseudo entry HTML page).

Figure 24:
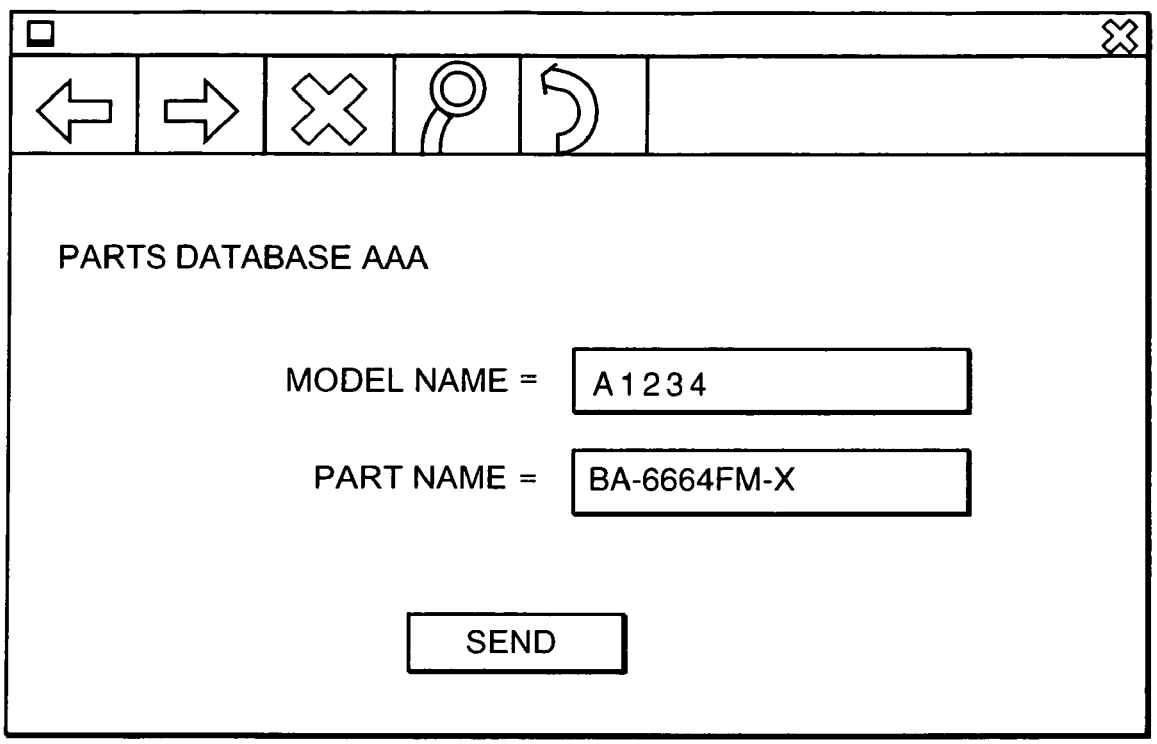
FIG. 24 A diagram showing an example pseudo entry HTML page according to the embodiment of the present invention.

FIG. 24 is a diagram showing an example pseudo entry HTML page according to the embodiment of the present invention. This pseudo entry HTML page is generated when a user selects the Web site for parts database AAA that is indicated in the network connection destination information shown in FIG. 20. As transmission information, the model name and the part number are designated in the records of the parts database AAA in the network connection destination information shown in FIG. 20. Therefore, the PC generates a pseudo entry HTML page in order to transmit, information to the URL for the parts database AAA, the model name and the part number for the selected graphics primitive. Since the pseudo entry HTML page is to be generated during the search request processing, and is not a page required by a user, the pseudo entry HTML page may also be so generated that a user can not browse it.

From among the records for a part corresponding to the graphics primitive found at step S1209, information required for the search for the selected graphics primitive (in this case, the model name and the part number) is embedded at predetermined locations on the pseudo entry HTML page (step S1215: Embed information required for search in pseudo entry HTML page). Then, the information required for the search is transmitted as information to the URL of the Web site using a predetermined transmission method, and a search is requested (step S1217: Transmit information to request search). Thereafter, the search results are received from the server for the Web site, and a new window is opened, for example, to display the search results (step S1219: Display search results).

An explanation will now be given for a program transmission method and a program reception method that are employed when the electronic service manual display program for this invention is transmitted or received as software via a communication line/a network. As is described above, in the configuration shown in FIG. 1, for example, an apparatus that employs an electronic service manual can obtain (download) from the server 72, through the network card drive 7 and the network 71, the control program 62 and the contents data 63 that are required to use the electronic service manual. The apparatus that employs the electronic service manual can also supply (upload) to the server 72, through the network card drive 7 and the network 71, the control program 62 and the contents data 63 that are required to use the electronic service manual.

Figure 25:
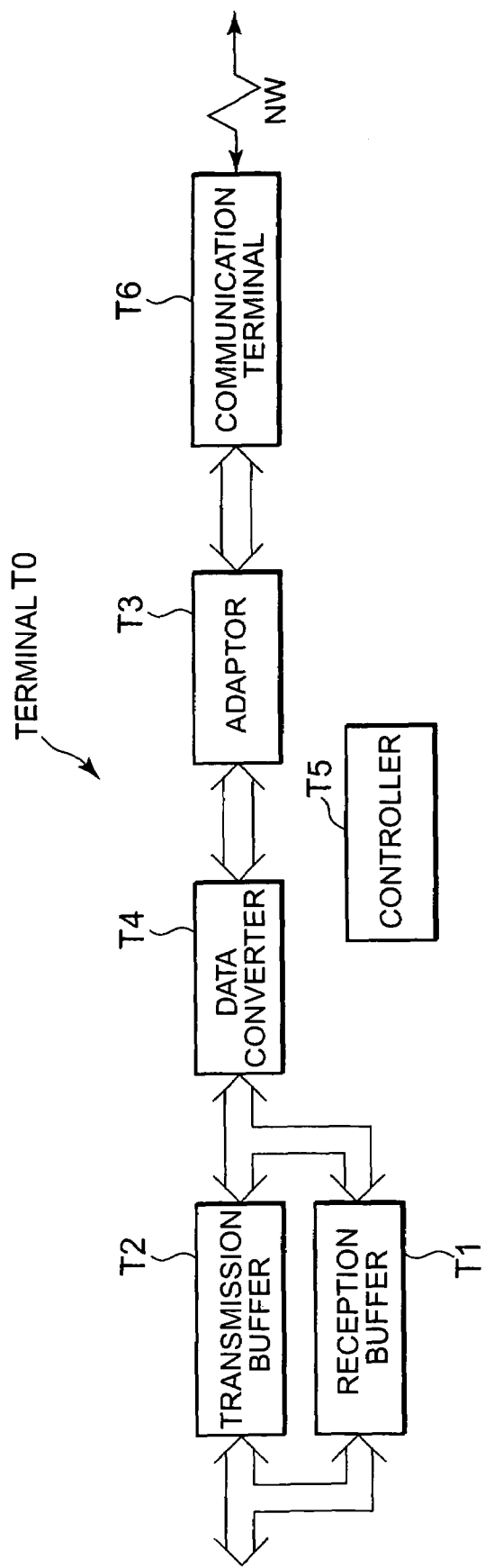
FIG. 25 A diagram showing the configuration of a terminal that can transmit and receive an electronic service manual display program for the embodiment of the present invention, and other, additional data.

FIG. 25 is a diagram showing the configuration of a terminal that can transmit and receive the electronic service manual display program for the embodiment of the invention, and the other, additional data. The control program 62 and the contents data 63 are transmitted by a terminal T0 to a communication line (e.g., a CATV network) or a network (e.g., the Internet), and are transferred as packets to another host in accordance with a communication protocol. Further, for the reception of the control program 62 and the contents data 63 from another host, the control program 62 and the contents data 63 are received as packets, and are stored, for example, in the RAM for the CPU 1 or the memory 2. It should be noted that the terminal T0 specifically represents a specific data transmission/reception function included in the apparatus that employs the electronic service manual and the server 72 shown in FIG. 1.

The terminal T0 in FIG. 25 comprises: a reception buffer T1, a transmission buffer T2, a communication interface adaptor (Adaptor) T3, a data converter T4, a controller T5 and a communication terminal T6. The controller T5 controls the operations of the individual components of the terminal T0, and executes the transmission processing sequences in a flowchart in FIG. 26 and the reception processing sequences in a flowchart in FIG. 27.

Figure 26:
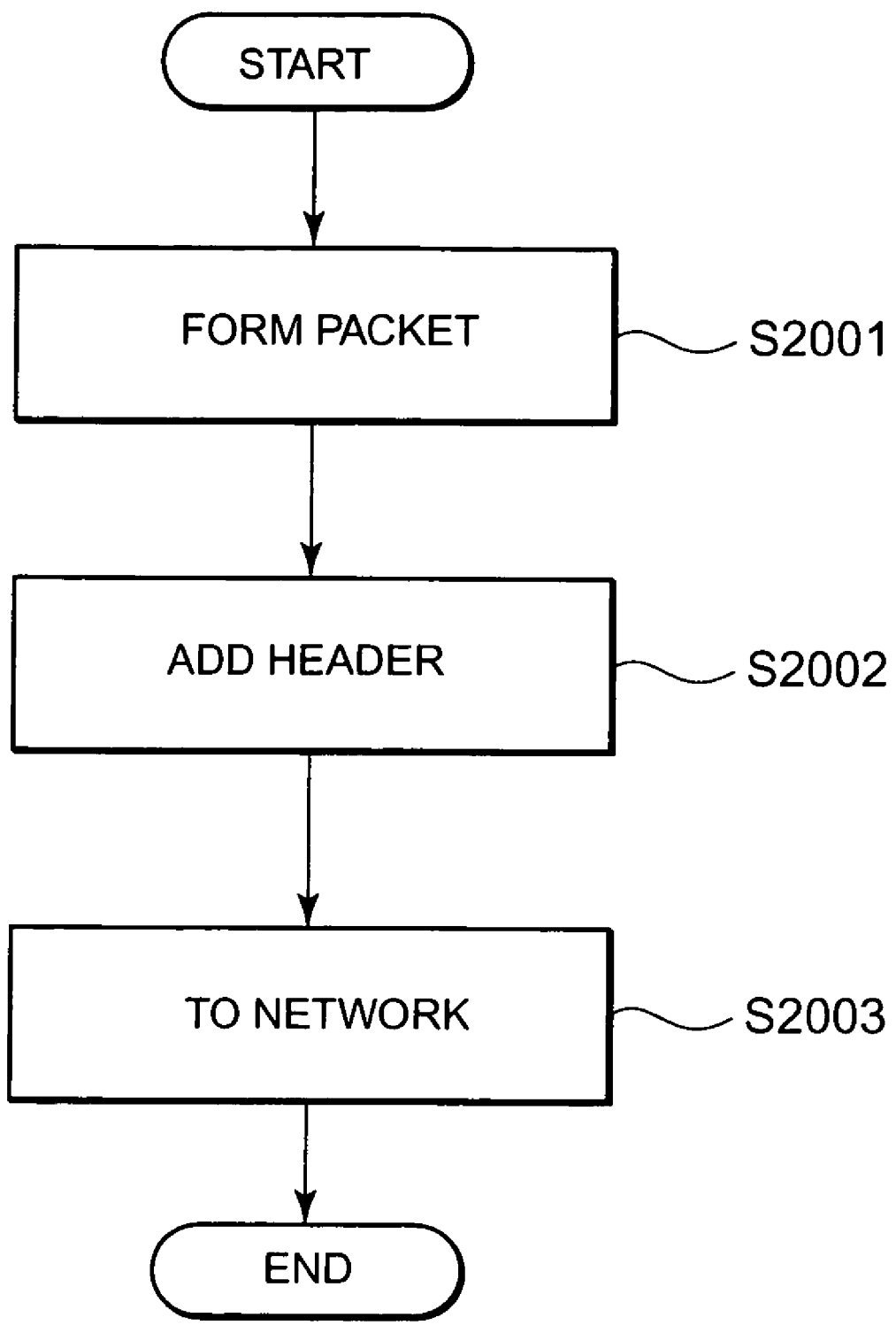
FIG. 26 A flowchart employed for the transfer (transmission) of the electronic service manual display program for the embodiment of the present invention, and other, additional data.
Figure 28:
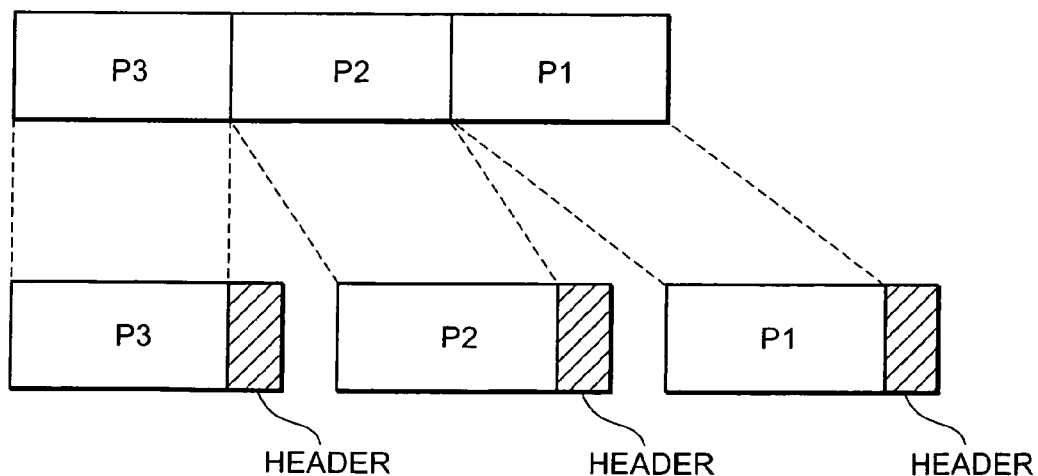
FIG. 28 An explanatory diagram for the formation of data packets performed by a data converter shown in FIG. 25.

FIG. 26 is a flowchart for the transfer (transmission) of the electronic service manual display program for the embodiment of the present invention, and other, additional data. In the flowchart shown in FIG. 26 for the transfer (transmission), for example, as is shown in FIG. 28, the electronic service manual display program (program information) according to this invention is broken by the data converter T4, via the transmission buffer T2, into blocks (called packets) P1, P2 and P3 of predetermined sizes (step S2001). Then, headers (addresses) are added, and the resultant packets are assembled or formatted into a digital signal sequence (step S2002). The packets are then transmitted from the communication terminal T6 to a communication network NW (corresponding to the network 71 in FIG. 1) through the adaptor T3, which employs a communication protocol to connect with a partner station (step S2003). The information carried by the packets shown in FIG. 28, which are routed across a communication network NW, is supplied in accordance with the communication protocol through a router R, which selects an optimal route, and a packet exchange Pn (n=1, 2, . . . , k) to the communication terminal T6 of the partner station in the communication network configuration shown in FIG. 30.

Figure 27:
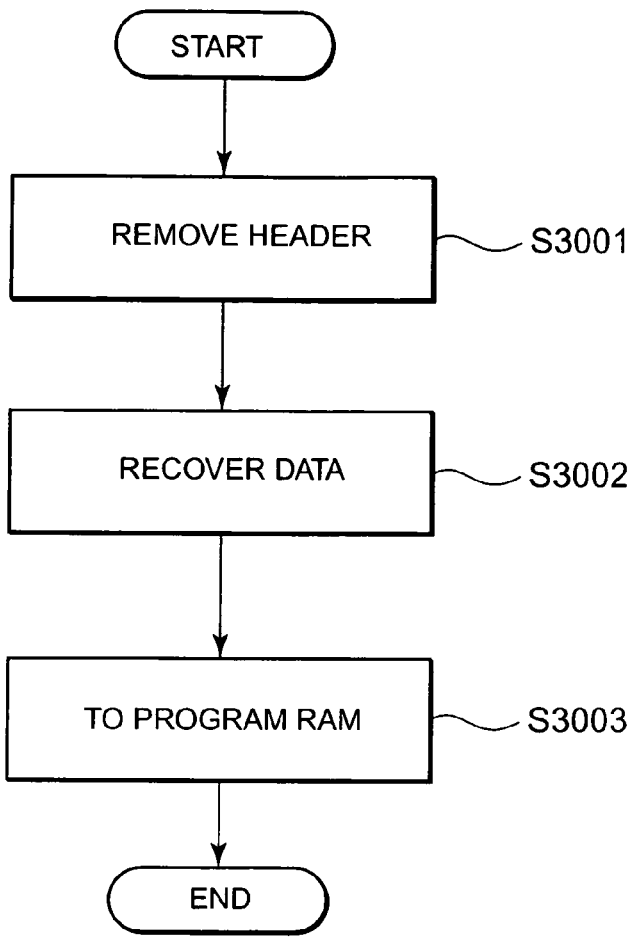
FIG. 27 A flowchart employed for the reception of the electronic service manual display program for the embodiment of the present invention, and other, additional data.
Figure 29:
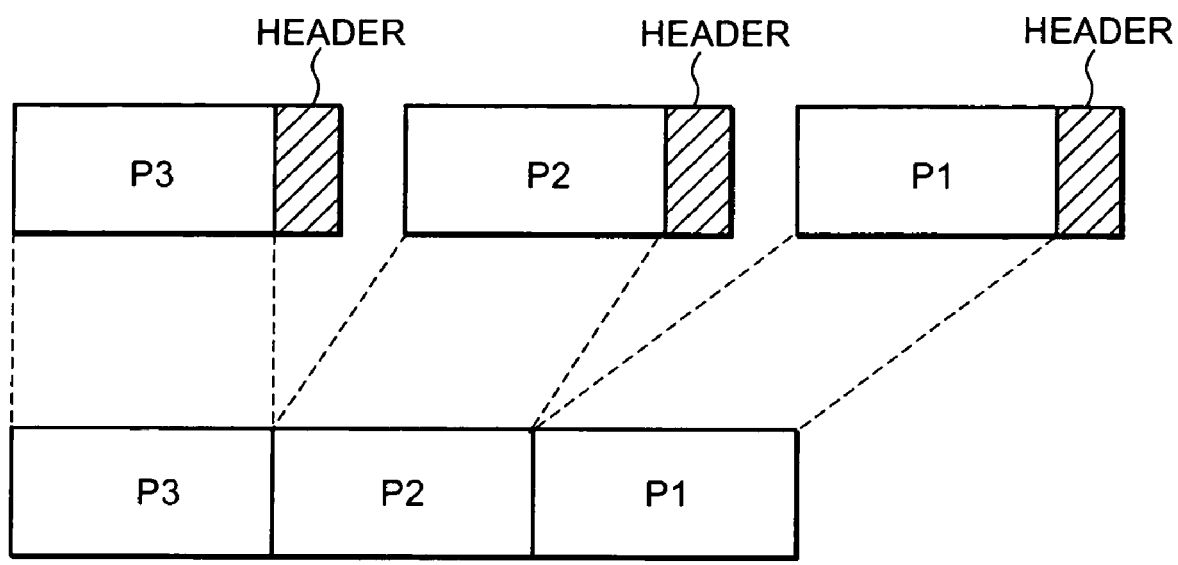
FIG. 29 An explanatory diagram for the recovery of data from the packets performed by the data converter shown in FIG. 25.

FIG. 27 is a flowchart for the reception of the electronic service manual display program for the embodiment of the present invention, and the other, additional data. The headers of the above described information received through the communication terminal T6 and the adaptor T3 are removed by the data converter T4, as is shown in FIG. 29 (step S3001). The resultant information is arranged in the order P1, P2 and P3, and the original data is recovered (step S3002). The thus obtained data is supplied as a program, through the reception buffer T1, to the internal memory (e.g., the RAM of the CPU 1 shown in FIG. 1) (step S3003). In this manner, the information is transmitted as packets to a partner station (a plurality of stations is also available), whereat the original information is recovered. Through this processing, the control program related to the electronic service manual, and the contents data, are transferred (transmitted) to and used by a partner.

In this embodiment, it is assumed that a requesting station (reception station) browses the Web page of a data supplying station (a transmission station or a server) and requests (accesses through the Internet), from among items available on the Web page, a desired control program and contents data, and that the transmission station, upon receiving the request, transmits the control program and the contents data to the requesting station. For the Internet, the TCP/IP protocol suite, for example, is generally employed as the communication interface adaptor T3. Furthermore, the present invention is not limited to the above described data transmission/reception mode, and in addition to the mode for transmitting data upon the reception of a request, unidirectional data transmission from the data supplying station to the other (reception station) is also enabled.

In this specification, an explanation has basically been given for the mode wherein the operation of this invention is performed when a CPU mounted in a computer, such as a PC, executes a predetermined program. In this case, as an example, the means for performing the steps in the individual flowcharts are provided by the CPU. However, when these means are constituted by hardware, a display control apparatus that provides the electronic service manual according to the invention, a transmission apparatus for transmitting a control program and contents data, and a reception apparatus for receiving a control program and contents data can also be obtained.

Technical ideas, other the claims, an understanding of which can be obtained during the course of the embodiment of the present invention will now be described.

An electronic service manual display program comprising a step of before the obtained information, of a type to be transmitted to the predetermined server, is transmitted to the predetermined server, generating an information transmission page on which a function is designated for employing a method, for a transmission to the predetermined server, for transmitting information of the type to be transmitted, so that the information transmission page need not be displayed on the display device, embedding, at a predetermined location on the information transmission page, the information of the type to be transmitted to the predetermined server, and transmitting, to the predetermined server, the information of the type that is embedded in the information transmission page and is to be transmitted to the predetermined server.

A recording medium, on which recorded is an electronic service manual display program that comprises a step of before the obtained information, of a type to be transmitted to the predetermined server, is transmitted to the predetermined server, generating an information transmission page on which a function is designated for employing a method, for a transmission to the predetermined server, for transmitting information of the type to be transmitted, so that the information transmission page need not be displayed on the display device, embedding, at a predetermined location on the information transmission page, the information of the type to be transmitted to the predetermined server, and transmitting, to the predetermined server, the information of the type that is embedded in the information transmission page and is to be transmitted to the predetermined server.

An electronic service manual display control method, for displaying, on a display device, information that is related to parts and that is used for a predetermined product constituted by an electric circuit or an electronic circuit employing the parts as components, and at the least either a board diagram that represents not only a board used for the predetermined product but also the parts mounted on the board, or a circuit diagram that represents a circuit provided on the board, comprising the steps of:

displaying an index page display area for displaying an index page on which a list of names for, at the least, either the board or the circuit is published;

displaying a parts table page display area for displaying a parts table page on which a list of the parts is published;

displaying a drawing display area to display a drawing, at the least, either a board diagram for the board or a circuit diagram for the circuit;

displaying the index page in the index page display area;

displaying the parts table page in the parts table page display area;

establishing in advance, for each of the names published on the index page, index page information, which is drawing identification information for the drawing corresponding to the names, and when one of the names displayed in the index page display area is selected, obtaining from the index page information the drawing identification information that is designated for the selected name;

when the thus obtained drawing identification information is information for a designation of the board diagram or the circuit diagram, searching for and displaying, in the drawing display area, the board diagram or the circuit diagram that corresponds to the drawing identification information;

when the drawing identification information thus obtained is information for a designation of both the board diagram and the circuit diagram, dividing the drawing display area into first and second display areas and searching for and displaying, in the first and second display areas, the board diagram and the circuit diagram that correspond to the drawing identification information;

reading network connection destination information that includes URL information for a predetermined server having an information search function, information indicating an information type to be transmitted to the predetermined server, and search setup information for which is designated information indicating a method for transmissions to the predetermined server;

establishing, in advance for one graphics primitive of graphics primitives that are constituents of the drawing, graphics primitive information, which is parts identification information corresponding to the part, and when a predetermined operation is performed for one of the graphics primitives that constitute the board diagram or the circuit diagram displayed in the drawing display area, examining the network connection destination information and generating and displaying menu information that includes a choice for an information search using the predetermined server;

when the choice is selected in the menu information, employing the parts identification information included in the graphics primitive information for the selected graphics primitive, and obtaining, from parts table database information wherein detailed information concerning each of the parts is stored with the parts identification information for the part, information of a type to be transmitted to the predetermined server;

employing the method for transmission to the predetermined server for transmitting, to the predetermined server specified by the URL information, the obtained information of the type to be transmitted to the predetermined server;

receiving, from the predetermined server, search results information concerning the information search that has been performed, by the predetermined server, based on the information transmitted to the predetermined server; and displaying the search results information that is received.

An electronic service manual display control method comprising a step of before the obtained information, of a type to be transmitted to the predetermined server, is transmitted to the predetermined server, generating an information transmission page on which a function is designated for employing a method, for a transmission to the predetermined server, for transmitting information of the type to be transmitted, so that the information transmission page need not be displayed on the display device, embedding, at a predetermined location on the information transmission page, the information of the type to be transmitted to the predetermined server, and transmitting, to the predetermined server, the information of the type that is embedded in the information transmission page and is to be transmitted to the predetermined server.

An electronic service manual display control apparatus, for displaying, on a display device, information that is related to parts and that is used for a predetermined product constituted by an electric circuit or an electronic circuit employing the parts as components, and at the least either a board diagram that represents not only a board used for the predetermined product but also the parts mounted on the board, or a circuit diagram that represents a circuit provided on the board, comprising:

means for displaying an index page display area for displaying an index page on which a list of names for, at the least, either the board or the circuit is published;

means for displaying a parts table page display area for displaying a parts table page on which a list of the parts is published;

means for displaying a drawing display area to display a drawing, at the least, either a board diagram for the board or a circuit diagram for the circuit;

means for displaying the index page in the index page display area;

means for displaying the parts table page in the parts table page display area;

means for establishing in advance, for each of the names published on the index page, index page information, which is drawing identification information for the drawing corresponding to the names, and for, when one of the names displayed in the index page display area is selected, obtaining from the index page information the drawing identification information that is designated for the selected name;

means for, when the thus obtained drawing identification information is information for a designation of the board diagram or the circuit diagram, searching for and displaying, in the drawing display area, the board diagram or the circuit diagram that corresponds to the drawing identification information;

means for, when the drawing identification information thus obtained is information for a designation of both the board diagram and the circuit diagram, dividing the drawing display area into first and second display areas and searching for and displaying, in the first and second display areas, the board diagram and the circuit diagram that correspond to the drawing identification information;

means for reading network connection destination information that includes URL information for a predetermined server having an information search function, information indicating an information type to be transmitted to the predetermined server, and search setup information for which is designated information indicating a method for transmissions to the predetermined server;

means for establishing, in advance for one graphics primitive of graphics primitives that are constituents of the drawing, graphics primitive information, which is parts identification information corresponding to the part, and for, when a predetermined operation is performed for one of the graphics primitives that constitute the board diagram or the circuit diagram displayed in the drawing display area, examining the network connection destination information and generating and displaying menu information that includes a choice for an information search using the predetermined server;

means for, when the choice is selected in the menu information, employing the parts identification information included in the graphics primitive information for the selected graphics primitive, and obtaining, from parts table database information wherein detailed information concerning each of the parts is stored with the parts identification information for the part, information of a type to be transmitted to the predetermined server;

means for employing the method for transmission to the predetermined server for transmitting, to the predetermined server specified by the URL information, the obtained information of the type to be transmitted to the predetermined server;

means for receiving, from the predetermined server, search results information concerning the information search that has been performed, by the predetermined server, based on the information transmitted to the predetermined server; and means for displaying the search results information that is received.

An electronic service manual display control apparatus comprising:

means for, before the obtained information, of a type to be transmitted to the predetermined server, is transmitted to the predetermined server, generating an information transmission page on which a function is designated for employing a method, for a transmission to the predetermined server, for transmitting information of the type to be transmitted, so that the information transmission page need not be displayed on the display device, for embedding, at a predetermined location on the information transmission page, the information of the type to be transmitted to the predetermined server, and for transmitting, to the predetermined server, the information of the type that is embedded in the information transmission page and is to be transmitted to the predetermined server.

A program transmission method, for transmitting an electronic service manual display program that permits a computer to provide a function for displaying, on a display device, information that is related to parts and that is used for a predetermined product constituted by an electric circuit or an electronic circuit employing the parts as components, and at the least either a board diagram that represents not only a board used for the predetermined product but also the parts mounted on the board, or a circuit diagram that represents a circuit provided on the board, comprising the steps of:

converting the electronic service manual display program into a digital signal sequence, for a communication line or a network, with an added header; and initiating employment of a communication protocol with a partner station across the communication line or the network and transmitting the digital signal sequence, whereby the electronic service manual display program includes the steps of displaying an index page display area for displaying an index page on which a list of names for, at the least, either the board or the circuit is published, displaying a parts table page display area for displaying a parts table page on which a list of the parts is published, displaying a drawing display area to display a drawing, at the least, either a board diagram for the board or a circuit diagram for the circuit, displaying the index page in the index page display area, displaying the parts table page in the parts table page display area, establishing in advance, for each of the names published on the index page, index page information, which is drawing identification information for the drawing corresponding to the names, and when one of the names displayed in the index page display area is selected, obtaining from the index page information the drawing identification information that is designated for the selected name, when the thus obtained drawing identification information is information for a designation of the board diagram or the circuit diagram, searching for and displaying, in the drawing display area, the board diagram or the circuit diagram that corresponds to the drawing identification information, when the drawing identification information thus obtained is information for a designation of both the board diagram and the circuit diagram, dividing the drawing display area into first and second display areas and searching for and displaying, in the first and second display areas, the board diagram and the circuit diagram that correspond to the drawing identification information, reading network connection destination information that includes URL information for a predetermined server having an information search function, information indicating an information type to be transmitted to the predetermined server, and search setup information for which is designated information indicating a method for transmissions to the predetermined server, establishing, in advance for one graphics primitive of graphics primitives that are constituents of the drawing, graphics primitive information, which is parts identification information corresponding to the part, and when a predetermined operation is performed for one of the graphics primitives that constitute the board diagram or the circuit diagram displayed in the drawing display area, examining the network connection destination information and generating and displaying menu information that includes a choice for an information search using the predetermined server, when the choice is selected in the menu information, employing the parts identification information included in the graphics primitive information for the selected graphics primitive, and obtaining, from parts table database information wherein detailed information concerning each of the parts is stored with the parts identification information for the part, information of a type to be transmitted to the predetermined server, employing the method for transmission to the predetermined server for transmitting, to the predetermined server specified by the URL information, the obtained information of the type to be transmitted to the predetermined server, receiving, from the predetermined server, search results information concerning the information search that has been performed, by the predetermined server, based on the information transmitted to the predetermined server, and displaying the search results information that is received.

A program transmission method, for transmitting an electronic service manual display program that comprises a step of before the obtained information, of a type to be transmitted to the predetermined server, is transmitted to the predetermined server, generating an information transmission page on which a function is designated for employing a method, for a transmission to the predetermined server, for transmitting information of the type to be transmitted, so that the information transmission page need not be displayed on the display device, embedding, at a predetermined location on the information transmission page, the information of the type to be transmitted to the predetermined server, and transmitting, to the predetermined server, the information of the type that is embedded in the information transmission page and is to be transmitted to the predetermined server.

A program transmission apparatus, for transmitting an electronic service manual display program that permits a computer to provide a function for displaying, on a display device, information that is related to parts and that is used for a predetermined product constituted by an electric circuit or an electronic circuit employing the parts as components, and at the least either a board diagram that represents not only a board used for the predetermined product but also the parts mounted on the board, or a circuit diagram that represents a circuit provided on the board, comprising:

conversion means for converting the electronic service manual display program into a digital signal sequence, for a communication line or a network, with an added header; and transmission means for initiating employment of a communication protocol with a partner station across the communication line or the network and transmitting the digital signal sequence, wherein the electronic service manual display program includes the steps of displaying an index page display area for displaying an index page on which a list of names for, at the least, either the board or the circuit is published, displaying a parts table page display area for displaying a parts table page on which a list of the parts is published, displaying a drawing display area to display a drawing, at the least, either a board diagram for the board or a circuit diagram for the circuit, displaying the index page in the index page display area, displaying the parts table page in the parts table page display area, establishing in advance, for each of the names published on the index page, index page information, which is drawing identification information for the drawing corresponding to the names, and when one of the names displayed in the index page display area is selected, obtaining from the index page information the drawing identification information that is designated for the selected name, when the thus obtained drawing identification information is information for a designation of the board diagram or the circuit diagram, searching for and displaying, in the drawing display area, the board diagram or the circuit diagram that corresponds to the drawing identification information, when the drawing identification information thus obtained is information for a designation of both the board diagram and the circuit diagram, dividing the drawing display area into first and second display areas and searching for and displaying, in the first and second display areas, the board diagram and the circuit diagram that correspond to the drawing identification information, reading network connection destination information that includes URL information for a predetermined server having an information search function, information indicating an information type to be transmitted to the predetermined server, and search setup information for which is designated information indicating a method for transmissions to the predetermined server, establishing, in advance for one graphics primitive of graphics primitives that are constituents of the drawing, graphics primitive information, which is parts identification information corresponding to the part, and when a predetermined operation is performed for one of the graphics primitives that constitute the board diagram or the circuit diagram displayed in the drawing display area, examining the network connection destination information and generating and displaying menu information that includes a choice for an information search using the predetermined server, when the choice is selected in the menu information, employing the parts identification information included in the graphics primitive information for the selected graphics primitive, and obtaining, from parts table database information wherein detailed information concerning each of the parts is stored with the parts identification information for the part, information of a type to be transmitted to the predetermined server, employing the method for transmission to the predetermined server for transmitting, to the predetermined server specified by the URL information, the obtained information of the type to be transmitted to the predetermined server, receiving, from the predetermined server, search results information concerning the information search that has been performed, by the predetermined server, based on the information transmitted to the predetermined server, and displaying the search results information that is received.

A program transmission apparatus, for transmitting an electronic service manual display program that comprises a step of before the obtained information, of a type to be transmitted to the predetermined server, is transmitted to the predetermined server, generating an information transmission page on which a function is designated for employing a method, for a transmission to the predetermined server, for transmitting information of the type to be transmitted, so that the information transmission page need not be displayed on the display device, embedding, at a predetermined location on the information transmission page, the information of the type to be transmitted to the predetermined server, and transmitting, to the predetermined server, the information of the type that is embedded in the information transmission page and is to be transmitted to the predetermined server.

A program reception method, for receiving an electronic service manual display program that permits a computer to provide a function for displaying, on a display device, information that is related to parts and that is used for a predetermined product constituted by an electric circuit or an electronic circuit employing the parts as components, and at the least either a board diagram that represents not only a board used for the predetermined product but also the parts mounted on the board, or a circuit diagram that represents a circuit provided on the board, comprising the steps of:

initiating employment of a communication protocol with a partner station across a communication line or a network and receiving a digital signal sequence; and removing headers from the digital signal sequence and converting the digital signal sequence used for a communication line or a network into the original electronic service manual display program, whereby the electronic service manual display program includes the steps of displaying an index page display area for displaying an index page on which a list of names for, at the least, either the board or the circuit is published, displaying a parts table page display area for displaying a parts table page on which a list of the parts is published, displaying a drawing display area to display a drawing, at the least, either a board diagram for the board or a circuit diagram for the circuit, displaying the index page in the index page display area, displaying the parts table page in the parts table page display area, establishing in advance, for each of the names published on the index page, index page information, which is drawing identification information for the drawing corresponding to the names, and when one of the names displayed in the index page display area is selected, obtaining from the index page information the drawing identification information that is designated for the selected name, when the thus obtained drawing identification information is information for a designation of the board diagram or the circuit diagram, searching for and displaying, in the drawing display area, the board diagram or the circuit diagram that corresponds to the drawing identification information, when the drawing identification information thus obtained is information for a designation of both the board diagram and the circuit diagram, dividing the drawing display area into first and second display areas and searching for and displaying, in the first and second display areas, the board diagram and the circuit diagram that correspond to the drawing identification information, reading network connection destination information that includes URL information for a predetermined server having an information search function, information indicating an information type to be transmitted to the predetermined server, and search setup information for which is designated information indicating a method for transmissions to the predetermined server, establishing, in advance for one graphics primitive of graphics primitives that are constituents of the drawing, graphics primitive information, which is parts identification information corresponding to the part, and when a predetermined operation is performed for one of the graphics primitives that constitute the board diagram or the circuit diagram displayed in the drawing display area, examining the network connection destination information and generating and displaying menu information that includes a choice for an information search using the predetermined server, when the choice is selected in the menu information, employing the parts identification information included in the graphics primitive information for the selected graphics primitive, and obtaining, from parts table database information wherein detailed information concerning each of the parts is stored with the parts identification information for the part, information of a type to be transmitted to the predetermined server, employing the method for transmission to the predetermined server for transmitting, to the predetermined server specified by the URL information, the obtained information of the type to be transmitted to the predetermined server, receiving, from the predetermined server, search results information concerning the information search that has been performed, by the predetermined server, based on the information transmitted to the predetermined server, and displaying the search results information that is received.

A program reception method, for receiving an electronic service manual display program that comprises a step of before the obtained information, of a type to be transmitted to the predetermined server, is transmitted to the predetermined server, generating an information transmission page on which a function is designated for employing a method, for a transmission to the predetermined server, for transmitting information of the type to be transmitted, so that the information transmission page need not be displayed on the display device, embedding, at a predetermined location on the information transmission page, the information of the type to be transmitted to the predetermined server, and transmitting, to the predetermined server, the information of the type that is embedded in the information transmission page and is to be transmitted to the predetermined server.

A program reception apparatus, for receiving an electronic service manual display program that permits a computer to provide a function for displaying, on a display device, information that is related to parts and that is used for a predetermined product constituted by an electric circuit or an electronic circuit employing the parts as components, and at the least either a board diagram that represents not only a board used for the predetermined product but also the parts mounted on the board, or a circuit diagram that represents a circuit provided on the board, comprising:

reception means for initiating employment of a communication protocol with a partner station across a communication line or a network and receiving a digital signal sequence; and conversion means for removing headers from the digital signal sequence and converting the digital signal sequence used for a communication line or a network into the original electronic service manual display program, wherein the electronic service manual display program includes the steps of displaying an index page display area for displaying an index page on which a list of names for, at the least, either the board or the circuit is published, displaying a parts table page display area for displaying a parts table page on which a list of the parts is published, displaying a drawing display area to display a drawing, at the least, either a board diagram for the board or a circuit diagram for the circuit, displaying the index page in the index page display area, displaying the parts table page in the parts table page display area, establishing in advance, for each of the names published on the index page, index page information, which is drawing identification information for the drawing corresponding to the names, and when one of the names displayed in the index page display area is selected, obtaining from the index page information the drawing identification information that is designated for the selected name, when the thus obtained drawing identification information is information for a designation of the board diagram or the circuit diagram, searching for and displaying, in the drawing display area, the board diagram or the circuit diagram that corresponds to the drawing identification information, when the drawing identification information thus obtained is information for a designation of both the board diagram and the circuit diagram, dividing the drawing display area into first and second display areas and searching for and displaying, in the first and second display areas, the board diagram and the circuit diagram that correspond to the drawing identification information, reading network connection destination information that includes URL information for a predetermined server having an information search function, information indicating an information type to be transmitted to the predetermined server, and search setup information for which is designated information indicating a method for transmissions to the predetermined server, establishing, in advance for one graphics primitive of graphics primitives that are constituents of the drawing, graphics primitive information, which is parts identification information corresponding to the part, and when a predetermined operation is performed for one of the graphics primitives that constitute the board diagram or the circuit diagram displayed in the drawing display area, examining the network connection destination information and generating and displaying menu information that includes a choice for an information search using the predetermined server, when the choice is selected in the menu information, employing the parts identification information included in the graphics primitive information for the selected graphics primitive, and obtaining, from parts table database information wherein detailed information concerning each of the parts is stored with the parts identification information for the part, information of a type to be transmitted to the predetermined server, employing the method for transmission to the predetermined server for transmitting, to the predetermined server specified by the URL information, the obtained information of the type to be transmitted to the predetermined server, receiving, from the predetermined server, search results information concerning the information search that has been performed, by the predetermined server, based on the information transmitted to the predetermined server, and displaying the search results information that is received.

A program reception apparatus, for receiving an electronic service manual display program that comprises a step of before the obtained information, of a type to be transmitted to the predetermined server, is transmitted to the predetermined server, generating an information transmission page on which a function is designated for employing a method, for a transmission to the predetermined server, for transmitting information of the type to be transmitted, so that the information transmission page need not be displayed on the display device, embedding, at a predetermined location on the information transmission page, the information of the type to be transmitted to the predetermined server, and transmitting, to the predetermined server, the information of the type that is embedded in the information transmission page and is to be transmitted to the predetermined server.

INDUSTRIAL APPLICABILITY

As is described above, the present invention relates to the browsing of the contents of an electronic service manual, and is effective for: an electronic service manual display program that is superior in the performance of an information search, whereby various data for a graphics primitive arbitrarily selected by a user can be transmitted to Web sites that are connected to the Internet or to an intranet, and whereby conventional databases on the Internet, such as a search site and a parts database site, are employed, and an appropriate search keyword is transmitted to the databases accumulated at these sites, whereat the history of operating failures of individual parts or methods for correcting the operating failures are stored, so that useful information for the individual parts can be obtained; a recording medium on which such a program is recorded; an electronic service manual display control method and an electronic service manual display control apparatus; a program transmission method and a program transmission apparatus; and a program reception method and a program reception apparatus. Further, the present invention is effective as an electronic service manual display program, which can reduce the labor required of an electronic service manual producer for the production of contents; a recording medium on which such a program is recorded; an electronic service manual display control method and an electronic service manual display apparatus; a program transmission method and a program transmission apparatus; and a program reception method and a program reception apparatus.

The invention claimed is:

1. A computer having an electronic service manual display program, wherein the program permits the computer to provide a function for displaying, on a display device, information that is related to parts and that is used for a predetermined product constituted by an electric circuit or an electronic circuit employing said parts as components, and at the least either a board diagram that represents not only a board used for said predetermined product but also said parts mounted on said board, or a circuit diagram that represents a circuit provided on said board, and which permits said computer to perform the steps of:

displaying, in a designated index page display area, an index page showing a list of names for, at the least, either said board or said circuit;

displaying, in a designated parts table page display area, a parts table page showing a list of said parts;

establishing in advance, for each of said names published on said index page, index page information, which is drawing identification information for a drawing, at the least either a board diagram for said board or a circuit diagram for said circuit, that corresponds to said name, and when one of said names displayed on said index page display area is selected, obtaining from said index page information said drawing identification information that is designated in correlation with said selected name;

searching for said drawing designated by said thus obtained drawing identification information, and displaying said drawing in a designated drawing display area;

reading network connection destination information that includes URL information for a predetermined server having an information search function, information indicating an information type to be transmitted to said predetermined server, and search setup information for which is designated information indicating a method for transmissions to said predetermined server;

establishing, in advance for one graphics primitive of graphics primitives that are constituents of said drawing, graphics primitive information, which is parts identification information corresponding to said part, and when a predetermined operation is performed for one of said graphics primitives that constitute said board diagram or said circuit diagram displayed in said drawing display area, examining said network connection destination information and generating and displaying menu information that includes a choice for an information search using said predetermined server;

when said choice is selected in said menu information, creating a pseudo entry page to send essential information for searching said selected graphics primitive to said predetermined server, employing said parts identification information included in said graphics primitive information for said selected graphics primitive, and obtaining, from parts table database information wherein detailed information concerning each of said parts is stored with said parts identification information for said part, information of a type to be transmitted to said predetermined server, and embedding, into said pseudo entry page, information of said type concerning each of said parts to be transmitted to said predetermined server;

employing said method for transmission to said predetermined server for transmitting, from said pseudo entry page to said predetermined server specified by said URL information, said obtained information of said type to be transmitted to said predetermined server;

receiving, from said predetermined server, search results information concerning said information search that has been performed, by said predetermined server, based on said information transmitted to said predetermined server; and displaying said search results information that is received.

2. A computer having an electronic service manual display program, wherein the program permits the computer to provide a function for displaying, on a display device, information that is related to parts and that is used for a predetermined product constituted by an electric circuit or an electronic circuit employing said parts as components, and at the least either a board diagram that represents not only a board used for said predetermined product but also said parts mounted on said board, or a circuit diagram that represents a circuit provided on said board, and which permits said computer to perform the steps of:

displaying an index page display area for displaying an index page on which a list of names for, at the least, either said board or said circuit is published;

displaying a parts table page display area for displaying a parts table page on which a list of said parts is published;

displaying a drawing display area to display a drawing, at the least, either a board diagram for said board or a circuit diagram for said circuit;

displaying said index page in said index page display area;

displaying said parts table page in said pads table page display area;

establishing in advance, for each of said names published on said index page, index page information, which is drawing identification information for said drawing corresponding to said names, and when one of said names displayed in said index page display area is selected, obtaining from said index page information said drawing identification information that is designated for said selected name;

when said thus obtained drawing identification information is information for a designation of said board diagram or said circuit diagram, searching for and displaying, in said drawing display area, said board diagram or said circuit diagram that corresponds to said drawing identification information;

when said drawing identification information thus obtained is information for a designation of both said board diagram and said circuit diagram, dividing said drawing display area into first and second display areas and searching for and displaying, in said first and second display areas, said board diagram and said circuit diagram that correspond to said drawing identification information;

reading network connection destination information that includes URL information for a predetermined server having an information search function, information indicating an information type to be transmitted to said predetermined server, and search setup information for which is designated information indicating a method for transmissions to said predetermined server;

establishing, in advance for one graphics primitive of graphics primitives that are constituents of said drawing, graphics primitive information, which is parts identification information corresponding to said part, and when a predetermined operation is performed for one of said graphics primitives that constitute said board diagram or said circuit diagram displayed in said drawing display area, examining said network connection destination information and generating and displaying menu information that includes a choice for an information search using said predetermined server;

when said choice is selected in said menu information, creating a pseudo entry page to send essential information for searching said selected graphics primitive to said predetermined server, employing said parts identification information included in said graphics primitive information for said selected graphics primitive, and obtaining, from parts table database information wherein detailed information concerning each of said parts is stored with said parts identification information for said part, information of a type to be transmitted to said predetermined server, and embedding, into said pseudo entry page, information of said type concerning each of said parts to be transmitted to said predetermined server;

employing said method for transmission to said predetermined server for transmitting, from said pseudo entry page to said predetermined server specified by said URL information, said obtained information of said type to be transmitted to said predetermined sewer;

receiving, from said predetermined server, search results information concerning said information search that has been performed, by said predetermined server, based on said information transmitted to said predetermined server; and displaying said search results information that is received.

3. A recording medium, on which recorded is an electronic service manual display program that permits a computer to provide a function for displaying, on a display device, information that is related to parts and that is used for a predetermined product constituted by an electric circuit or an electronic circuit employing said parts as components, and at the least either a board diagram that represents not only a board used for said predetermined product but also said parts mounted on said board, or a circuit diagram that represents a circuit provided on said board, and that permits said computer to perform the steps of:

displaying, in a designated index page display area, an index page showing a list of names for, at the least, either said board or said circuit;

displaying, in a designated parts table page display area, a parts table page showing a list of said parts;

establishing in advance, for each of said names published on said index page, index page information, which is drawing identification information for a drawing, at the least either a board diagram for said board or a circuit diagram for said circuit, that corresponds to said name, and when one of said names displayed on said index page display area is selected, obtaining from said index page information said drawing identification information that is designated in correlation with said selected name;

searching for said drawing designated by said thus obtained drawing identification information, and displaying said drawing in a designated drawing display area;

reading network connection destination information that includes URL information for a predetermined server having an information search function, information indicating an information type to be transmitted to said predetermined server, and search setup information for which is designated information indicating a method for transmissions to said predetermined server;

establishing, in advance for one graphics primitive of graphics primitives that are constituents of said drawing, graphics primitive information, which is parts identification information corresponding to said part, and when a predetermined operation is performed for one of said graphics primitives that constitute said board diagram or said circuit diagram displayed in said drawing display area, examining said network connection destination information and generating and displaying menu information that includes a choice for an information search using said predetermined server;

when said choice is selected in said menu information, creating a pseudo entry page to send essential information for searching said selected graphics primitive to said predetermined server, employing said parts identification information included in said graphics primitive information for said selected graphics primitive, and obtaining, from parts table database information wherein detailed information concerning each of said parts is stored with said parts identification information for said part, information of a type to be transmitted to said predetermined server, and embedding, into said pseudo entry page, information of said type concerning each of said parts to be transmitted to said predetermined server;

employing said method for transmission to said predetermined server for transmitting, from said pseudo entry page to said predetermined server specified by said URL information, said obtained information of said type to be transmitted to said predetermined server;

receiving, from said predetermined server, search results information concerning said information search that has been performed, by said predetermined server, based on said information transmitted to said predetermined server; and displaying said search results information that is received.

4. A recording medium, on which recorded is an electronic service manual display program that permits a computer to provide a function for displaying, on a display device, information that is related to parts and that is used for a predetermined product constituted by an electric circuit or an electronic circuit employing said parts as components, and at the least either a board diagram that represents not only a board used for said predetermined product but also said parts mounted on said board, or a circuit diagram that represents a circuit provided on said board, and that permits said computer to perform the steps of:

displaying an index page display area for displaying an index page on which a list of names for, at the least, either said board or said circuit is published;

displaying a parts table page display area for displaying a parts table page on which a list of said parts is published;

displaying a drawing display area to display a drawing, at the least, either a board diagram for said board or a circuit diagram for said circuit;

displaying said index page in said index page display area;

displaying said parts table page in said parts table page display area;

establishing in advance for each of said names published on said index page, index page information, which is drawing identification information for said drawing corresponding to said names, and when one of said names displayed in said index page display area is selected, obtaining from said index page information said drawing identification information that is designated for said selected name;

when said thus obtained drawing identification information is information for a designation of said board diagram or said circuit diagram, searching for and displaying, in said drawing display area, said board diagram or said circuit diagram that corresponds to said drawing identification information;

when said drawing identification information thus obtained is information for a designation of both said board diagram and said circuit diagram, dividing said drawing display area into first and second display areas and searching for and displaying, in said first and second display areas, said board diagram and said circuit diagram that correspond to said drawing identification information;

reading network connection destination information that includes URL information for a predetermined server having an information search function, information indicating an information type to be transmitted to said predetermined server, and search setup information for which is designated information indicating a method for transmissions to said predetermined server;

establishing, in advance for one graphics primitive of graphics primitives that are constituents of said drawing, graphics primitive information, which is parts identification information corresponding to said part, and when a predetermined operation is performed for one of said graphics primitives that constitute said board diagram or said circuit diagram displayed in said drawing display area, examining said network connection destination information and generating and displaying menu information that includes a choice for an information search using said predetermined server;

when said choice is selected in said menu information, creating a pseudo entry page to send essential information for searching said selected graphics primitive to said predetermined server, employing said parts identification information included in said graphics primitive information for said selected graphics primitive, and obtaining, from parts table database information wherein detailed information concerning each of said parts is stored with said parts identification information for said part, information of a type to be transmitted to said predetermined server, and embedding, into said pseudo entry page, information of said type concerning each of said parts to be transmitted to said predetermined server;

employing said method for transmission to said predetermined server for transmitting, from said pseudo entry page to said predetermined server specified by said URL information, said obtained information of said type to be transmitted to said predetermined server;

receiving, from said predetermined server, search results information concerning said information search that has been performed, by said predetermined server, based on said information transmitted to said predetermined server; and displaying said search results information that is received.

5. An electronic service manual display control method, for displaying, on a display device, information that is related to parts and that is used for a predetermined product constituted by an electric circuit or an electronic circuit employing said parts as components, and at the least either a board diagram that represents not only a board used for said predetermined product but also said parts mounted on said board, or a circuit diagram that represents a circuit provided on said board, comprising the steps of:

displaying, in a designated index page display area, an index page showing a list of names for, at the least, either said board or said circuit;

displaying, in a designated parts table page display area, a parts table page showing a list of said parts;

establishing in advance, for each of said names published on said index page, index page information, which is drawing identification information for a drawing, at the least either a board diagram for said board or a circuit diagram for said circuit, that corresponds to said name, and when one of said names displayed on said index page display area is selected, obtaining from said index page information said drawing identification information that is designated in correlation with said selected name;

searching for said drawing designated by said thus obtained drawing identification information, and displaying said drawing in a designated drawing display area;

reading network connection destination information that includes URL information for a predetermined server having an information search function, information indicating an information type to be transmitted to said predetermined server, and search setup information for which is designated information indicating a method for transmissions to said predetermined server;

establishing, in advance for one graphics primitive of graphics primitives that are constituents of said drawing, graphics primitive information, which is parts identification information corresponding to said part, and when a predetermined operation is performed for one of said graphics primitives that constitute said board diagram or said circuit diagram displayed in said drawing display area, examining said network connection destination information and generating and displaying menu information that includes a choice for an information search using said predetermined server;

when said choice is selected in said menu information, creating a pseudo entry page to send essential information for searching said selected graphics primitive to said predetermined server, employing said parts identification information included in said graphics primitive information for said selected graphics primitive, and obtaining, from parts table database information wherein detailed information concerning each of said parts is stored with said parts identification information for said part, information of a type to be transmitted to said predetermined server, and embedding, into said pseudo entry page, information of said type concerning each of said parts to be transmitted to said predetermined server;

employing said method for transmission to said predetermined server for transmitting, from said pseudo entry page to said predetermined server specified by said URL information, said obtained information of said type to be transmitted to said predetermined server;

receiving, from said predetermined server, search results information concerning said information search that has been performed, by said predetermined server, based on said information transmitted to said predetermined server; and displaying said search results infom-iation that is received.

6. An electronic service manual display control method, for displaying on a display device, information that is related to parts and that is used for a predetermined product constituted by an electric circuit or an electronic circuit employing said parts as components, and at the least either a board diagram that represents not only a board used for said predetermined product but also said parts mounted on said board, or a circuit diagram that represents a circuit provided on said board, comprising the steps of:

displaying an index page display area for displaying an index page on which a list of names for, at the least, either said board or said circuit is published;

displaying a parts table page display area for displaying a parts table page on which a list of said parts is published;

displaying a drawing display area to display a drawing, at the least, either a board diagram for said board or a circuit diagram for said circuit;

displaying said index page in said index page display area;

displaying said parts table page in said parts table page display area;

establishing in advance, for each of said names published on said index page, index page information, which is drawing identification information for said drawing corresponding to said names, and when one of said names displayed in said index page display area is selected, obtaining from said index page information said drawing identification information that is designated for said selected name;

when said thus obtained drawing identification information is information for a designation of said board diagram or said circuit diagram, searching for and displaying, in said drawing display area, said board diagram or said circuit diagram that corresponds to said drawing identification information;

when said drawing identification information thus obtained is information for a designation of both said board diagram and said circuit diagram, dividing said drawing display area into first and second display areas and searching for and displaying, in said first and second display areas, said board diagram and said circuit diagram that correspond to said drawing identification information;

reading network connection destination information that includes URL information for a predetermined server having an information search function, information indicating an information type to be transmitted to said predetermined server, and search setup information for which is designated information indicating a method for transmissions to said predetermined server;

establishing, in advance for one graphics primitive of graphics primitives that are constituents of said drawing, graphics primitive information, which is parts identification information corresponding to said part, and when a predetermined operation is performed for one of said graphics primitives that constitute said board diagram or said circuit diagram displayed in said drawing display area, examining said network connection destination information and generating and displaying menu information that includes a choice for an information search using said predetermined server;

when said choice is selected in said menu information, creating a pseudo entry page to send essential information for searching said selected graphics primitive to said predetermined server, employing said parts identification information included in said graphics primitive information for said selected graphics primitive, and obtaining, from parts table database information wherein detailed information concerning each of said parts is stored with said parts identification information for said part, information of a type to be transmitted to said predetermined server, and embedding, into said pseudo entry page, information of said type concerning each of said parts to be transmitted to said predetermined server;

employing said method for transmission to said predetermined server for transmitting, from said pseudo entry page to said predetermined server specified by said URL information, said obtained information of said type to be transmitted to said predetermined server;

receiving, from said predetermined server, search results information concerning said information search that has been performed, by said predetermined server, based on said information transmitted to said predetermined server; and displaying said search results information that is received.

7. An electronic service manual display control apparatus displaying, on a display device, information that is related to parts and that is used for a predetermined product constituted by an electric circuit or an electronic circuit employing said parts as components, and at the least either a board diagram that represents not only a board used for said predetermined product but also said parts mounted on said board, or a circuit diagram that represents a circuit provided on said board, comprising:

means for displaying, in a designated index page display area, an index page showing a list of names for, at the least, either said board or said circuit;

means for displaying, in a designated parts table page display area, a parts table page showing a list of said parts;

means for establishing in advance, for each of said names published on said index page, index page information, which is drawing identification information for a drawing, at the least either a board diagram for said board or a circuit diagram for said circuit, that corresponds to said name, and for, when one of said names displayed on said index page display area is selected, obtaining from said index page information said drawing identification information that is designated in correlation with said selected name;

means for searching for said drawing designated by said thus obtained drawing identification information, and displaying said drawing in a designated drawing display area;

means for reading network connection destination information that includes URL information for a predetermined server having an information search function, information indicating an information type to be transmitted to said predetermined server, and search setup information for which is designated information indicating a method for transmissions to said predetermined server;

means for establishing, in advance for one graphics primitive of graphics primitives that are constituents of said drawing, graphics primitive information, which is parts identification information corresponding to said part, and for, when a predetermined operation is performed for one of said graphics primitives that constitute said board diagram or said circuit diagram displayed in said drawing display area, examining said network connection destination information and generating and displaying menu information that includes a choice for an information search using said predetermined server;

means for, when said choice is selected in said menu information, creating a pseudo entry page to send essential information for searching said selected graphics primitive to said predetermined server, employing said pads identification information included in said graphics primitive information for said selected graphics primitive, and obtaining, from parts table database information wherein detailed information concerning each of said parts is stored with said parts identification information for said part, information of a type to be transmitted to said predetermined server, and embedding, into said pseudo entry page, information of said type concerning each of said parts to be transmitted to said predetermined server;

means for employing said method for transmission to said predetermined server for transmitting, from said pseudo entry page to said predetermined server specified by said URL information, said obtained information of said type to be transmitted to said predetermined server;

means for receiving, from said predetermined server, search results information concerning said information search that has been performed, by said predetermined server, based on said information transmitted to said predetermined server; and means for displaying said search results information that is received.

8. An electronic service manual display control apparatus displaying, on a display device, information that is related to parts and that is used for a predetermined product constituted by an electric circuit or an electronic circuit employing said parts as components, and at the least either a board diagram that represents not only a board used for said predetermined product but also said parts mounted on said board, or a circuit diagram that represents a circuit provided on said board, comprising:

means for displaying an index page display area for displaying an index page on which a list of names for, at the least, either said board or said circuit is published;

means for displaying a parts table page display area for displaying a parts table page on which a list of said parts is published;

means for displaying a drawing display area to display a drawing, at the least, either a board diagram for said board or a circuit diagram for said circuit;

means for displaying said index page in said index page display area;

means for displaying said parts table page in said parts table page display area;

means for establishing in advance, for each of said names published on said index page, index page information, which is drawing identification information for said drawing corresponding to said names, and for, when one of said names displayed in said index page display area is selected, obtaining from said index page information said drawing identification information that is designated for said selected name;

means for, when said thus obtained drawing identification information is information for a designation of said board diagram or said circuit diagram, searching for and displaying, in said drawing display area, said board diagram or said circuit diagram that corresponds to said drawing identification information;

means for, when said drawing identification information thus obtained is information for a designation of both said board diagram and said circuit diagram, dividing said drawing display area into first and second display areas and searching for and displaying, in said first and second display areas, said board diagram and said circuit diagram that correspond to said drawing identification information;

means for reading network connection destination information that includes URL information for a predetermined server having an information search function, information indicating an information type to be transmitted to said predetermined server, and search setup information for which is designated information indicating a method for transmissions to said predetermined server;

means for establishing, in advance for one graphics primitive of graphics primitives that are constituents of said drawing, graphics primitive information, which is parts identification information corresponding to said part, and for, when a predetermined operation is performed for one of said graphics primitives that constitute said board diagram or said circuit diagram displayed in said drawing display area, examining said network connection destination information and generating and displaying menu information that includes a choice for an information search using said predetermined server;

means for, when said choice is selected in said menu information, creating a pseudo entry page to send essential information for searching said selected graphics primitive to said predetermined server, employing said parts identification information included in said graphics primitive information for said selected graphics primitive, and obtaining, from parts table database information wherein detailed information concerning each of said parts is stored with said parts identification information for said part, information of a type to be transmitted to said predetermined server, and embedding, into said pseudo entry page, information of said type concerning each of said parts to be transmitted to said predetermined server;

means for employing said method for transmission to said predetermined server for transmitting, from said pseudo entry page to said predetermined server specified by said URL information, said obtained information of said type to be transmitted to said predetermined server;

means for receiving, from said predetermined server, search results information concerning said information search that has been performed, by said predetermined server, based on said information transmuted to said predetermined server; and means for displaying said search results information that is received.

* * * * *